US007738982B2

(12) United States Patent
Kobayashi et al.

(10) Patent No.: US 7,738,982 B2
(45) Date of Patent: Jun. 15, 2010

(54) INFORMATION PROCESSING APPARATUS, INFORMATION PROCESSING METHOD AND PROGRAM

(75) Inventors: Yoshiyuki Kobayashi, Tokyo (JP); Susumu Takatsuka, Tokyo (JP)

(73) Assignee: Sony Corporation, Tokyo (JP)

( * ) Notice: Subject to any disclaimer, the term of this patent is extended or adjusted under 35 U.S.C. 154(b) by 882 days.

(21) Appl. No.: 11/584,612

(22) Filed: Oct. 23, 2006

(65) Prior Publication Data

US 2007/0095197 A1 May 3, 2007

(30) Foreign Application Priority Data

Oct. 25, 2005 (JP) ........................... P2005-310407

(51) Int. Cl.
*G06F 17/00* (2006.01)

(52) U.S. Cl. ........................................................ 700/94

(58) Field of Classification Search ................... 700/94; 704/223, 236–240, 270; 84/616, 654
See application file for complete search history.

(56) References Cited

U.S. PATENT DOCUMENTS

| | | | |
|---|---|---|---|
| 5,929,360 | A | 7/1999 | Szalay |
| 6,519,579 | B1 | 2/2003 | Plankensteiner et al. |
| 2002/0194000 | A1 | 12/2002 | Bennett et al. |
| 2004/0181401 | A1 | 9/2004 | Pachet et al. |
| 2005/0131688 | A1 | 6/2005 | Goronzy et al. |

FOREIGN PATENT DOCUMENTS

| | | |
|---|---|---|
| EP | 1 531 478 A1 | 5/2005 |
| GB | 2 319 884 A | 6/1998 |
| JP | 6-175687 | 6/1994 |
| JP | 8-263660 | 10/1996 |
| JP | 2002-501637 | 1/2002 |
| JP | 2002-278547 | 9/2002 |
| JP | 2003-162294 | 6/2003 |
| JP | 2005-141430 | 6/2005 |
| JP | 2005-173569 | 6/2005 |

OTHER PUBLICATIONS

Scaringella et al.; "A Real-Time Beat Tracker for Unrestricted Audio Signals"; In: Actes Des Journees D'Informatique Musicale Jim2004m, Paris, Iscas, SPIE, 2004, XP 002418987.

*Primary Examiner*—Andrew C Flanders
(74) *Attorney, Agent, or Firm*—Finnegan, Henderson, Farabow, Garrett & Dunner, L.L.P.

(57) ABSTRACT

Disclosed herein is an information processing apparatus which arithmetically operates a characteristic amount of content data, including: first arithmetic operation means for using a low level characteristic amount extraction expression to arithmetically operate the low level characteristic amount; second arithmetic operation means for using a high level characteristic amount extraction expression to arithmetically operate the high level characteristic amount; calculation means for calculating an error between the high level characteristic amount and a high level characteristic amount obtained in advance and corresponding to the content data; production means for producing an error estimation expression by learning wherein the error calculated by the calculation means is used as teacher data; and arithmetic operation control means for applying, when the high level characteristic amount corresponding to the content data is to be acquired, the low level characteristic amount to the error estimation expression.

6 Claims, 34 Drawing Sheets

| INPUT DATA | EXPLANATION | POSSESSING DIMENSIONS |
|---|---|---|
| Wav | PCM WAVEFORM DATA | TIME, Ch |
| 12tones | RESULT OF ANALYSIS OF PCM WAVEFORM DATA WITH TIME - MUSICAL INTERVAL | TIME, MUSICAL INTERVAL |
| Chord | CHORD PROCESS OF MUSICAL PIECE | TIME, MUSICAL INTERVAL |
| Key | KEY OF MUSICAL PIECE | TIME, MUSICAL INTERVAL |

FIG. 14

CHORD: CHORD SIGNAL DATA OF MUSICAL PIECE

24 TYPES

| | | | | | | | | |
|---|---|---|---|---|---|---|---|---|
| Bm | 0 | 0 | 0 | 0 | 18 | 6 | 0 | 0 |
| ••• | | | | | | | | |
| D | 0 | 0 | 5 | 1 | 22 | 11 | 0 | 0 |
| C# | 0 | 0 | 0 | 0 | 0 | 0 | 0 | 0 |
| C | 100 | 97 | 26 | 13 | 23 | 12 | 85 | 96 |

TIME (BEAT)

• THE VALUE REPRESENTS TIME, PROBABILITY OF THE CHORD

FIG. 15

Key: KEY DATA OF MUSICAL PIECE

12 TYPES

| | | | | | | | | |
|---|---|---|---|---|---|---|---|---|
| B | 0 | 0 | 0 | 0 | 0 | 0 | 0 | 0 |
| ••• | | | | | | | | |
| D | 0 | 0 | 0 | 0 | 2 | 1 | 0 | 0 |
| C# | 0 | 0 | 0 | 0 | 0 | 0 | 0 | 0 |
| C | 97 | 98 | 99 | 96 | 95 | 97 | 96 | 95 |

TIME (BEAT)

• THE VALUE REPRESENTS TIME, PROBABILITY OF THE CHORD

FIG.21A

FIG.21B

EXAMPLE: MEAN VALUES OF AXIS DESIGNATED AS Mean

| MUSIC INTERVAL /TIME | 1 | 2 | 3 | 4 | 5 | 6 | 7 | 8 |
|---|---|---|---|---|---|---|---|---|
| B7 | 2 | 3 | 4 | 3 | 3 | 3 | 4 | 4 |
| ... | | | | | | | | |
| D1 | 1 | 2 | 3 | 2 | 3 | 4 | 3 | 2 |
| C#1 | 0 | 0 | 0 | 0 | 1 | 2 | 1 | 0 |
| C1 | 2 | 0 | 0 | 0 | 2 | 0 | 0 | 0 |

MEAN ON TIME AXIS

| MUSIC INTERVAL | |
|---|---|
| B7 | 3.25 |
| ... | |
| D1 | 2.5 |
| C#1 | 0.5 |
| C1 | 0.5 |

Regression (LINEAR)
$X_n$: LOW LEVEL CHARACTERISTIC AMOUNT, $b_n$: PARAMETER

Regression (NON-LINEAR)
$X_n$: LOW LEVEL CHARACTERISTIC AMOUNT, $b_{nm}$: PARAMETER
X (x, y): KERNEL FUNCTION

FIG. 27

Classify (EUCLIDIAN DISTANCE)
CALCULATE EUCLIDEAN DISTANCE FROM CENTER OF EACH CLASS AND CLASSIFY INTO NEAREST CLASS

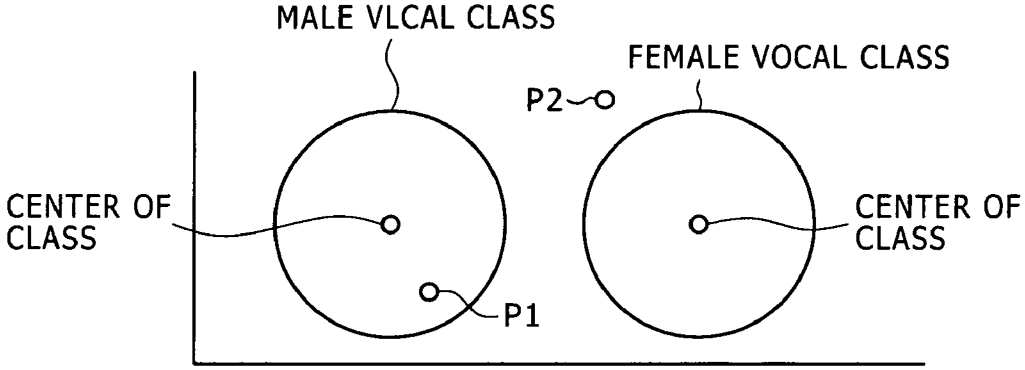

CHARACTERISTIC AMOUNT SPACE

EUCLIDEAN DISTANCE:
X: LOW LEVEL CHARACTERISTIC AMOUNT
T: MEAN OF LOW LEVEL CHARACTERISTIC AMOUNTS OF TEACHER DATA BELONGING TO CLASS $$d = \sqrt{(X-T)^T (X-T)}$$

FIG. 28

Classify (VECTOR CORRELATION)
CALCULATE CORRELATION WITH MEAN VECTOR OF EACH CLASS AND CLASSIFY INTO CLASS HIGHEST CORRELATION

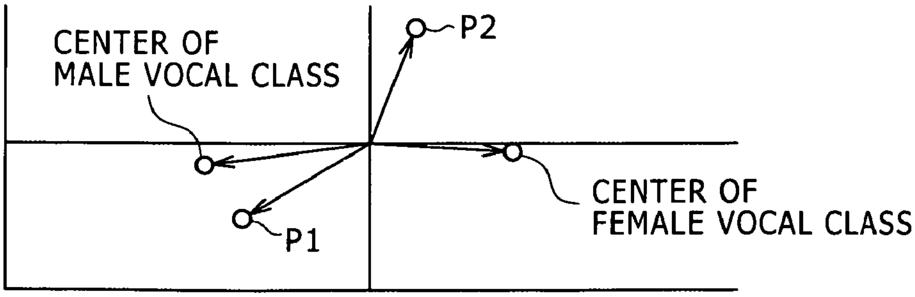

CHARACTERISTIC AMOUNT SPACE

CORRELATION COEFFICIENT:
X: LOW LEVEL CHARACTERISTIC AMOUNT
T: MEAN OF LOW LEVEL CHARACTERISTIC AMOUNTS OF TEACHER DATA BELONGING TO THIS CLASS $$correl = (X/T^T) / (|X||T|)$$

FIG. 29

Classify (MAHALANOBIS DISTANCE)
CALCULATE MAHALANOBIS DISTANCE FROM EACH CLASS AND CLASSIFY INTO NEAREST CLASS

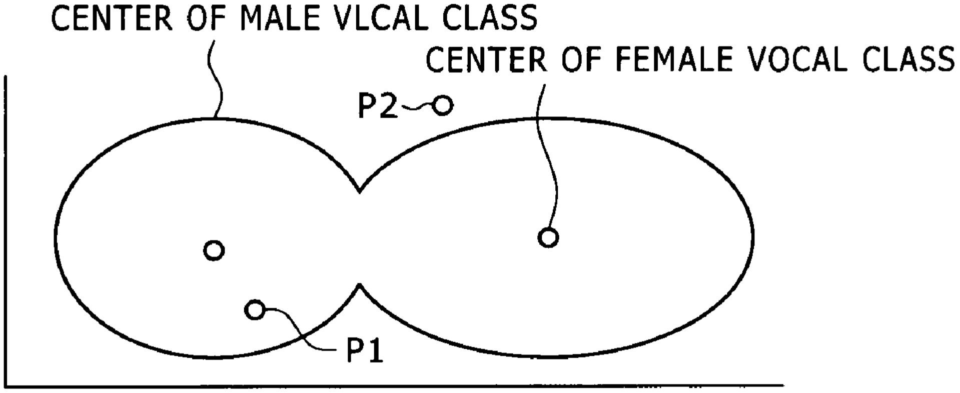

CHARACTERISTIC AMOUNT SPACE

MAHALANOBIS DISTANCE:
X: LOW LEVEL CHARACTERISTIC AMOUNT
Σ: VARIANCE COVARIANCE MATRIX OF LOW LEVEL CHARACTERISTIC AMOUNTS OF TEACHER DATA BELONGING TO THIS CLASS
T: MEAN OF LOW LEVEL CHARACTERISTIC AMOUNTS OF TEACHER DATA BELONGING TO THIS CLASS $$d = \sqrt{(X-T)^T \Sigma^{-1} (X-T)}$$

Classify (VARIOUS MIXTURE MODEL)
REPRESENT DISTRIBUTION OF EACH CLASS WITH A PLURALITY OF CLASSES EUCLIDEAN DISTANCE → KNN
(K-nearest neighbor)

MAHALANOBIS DISTANCE → GMM
(Gaussian Mixture Model)

FIG. 31

SVM (Support Vector Machine)
SEPARATION PLANE BETWEEN CLASSES IS REPRESENTED BY SUPPORT VECTOR
$X_n$: LOW LEVEL CHARACTERISTIC AMOUNT, $b_{nm}$: PARAMETER
X (x, y): KERNEL FUNCTION
$Y = b_1K(b_1, X) + b_3Y(b_3, X) + \cdots b_0$

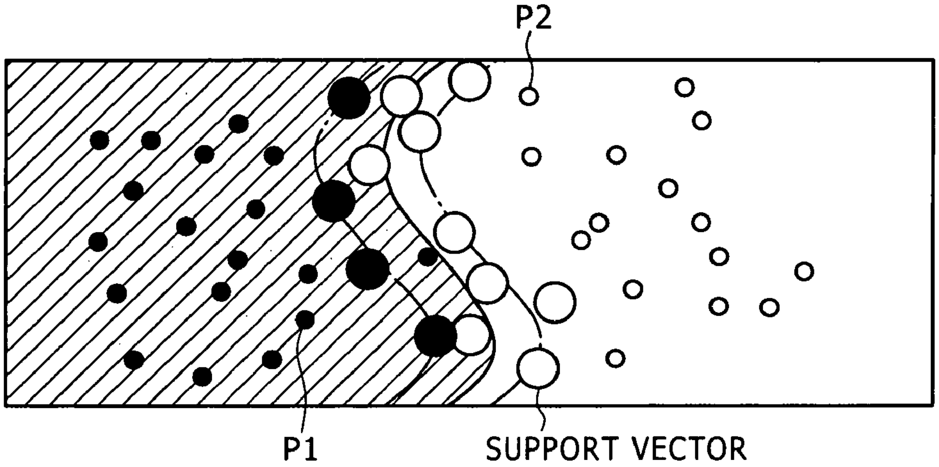

ESTIMATE $b_{nm}$ SO THAT DISTANCE (MARGIN) BETWEEN SEPARATION PLANE AND VECTOR IN THE PROXIMITY OF BOUNDARY MAY BE MAXIMUM

FIG. 32

GP (Genetic Programming)
EXPRESSION WHEREIN LOW LEVEL CHARACTERISTIC AMOUNTS ARE COMBINED IS PRODUCED BY GP EXAMPLE OF EXPRESSION PRODUCED:
$Y = ((X_2 + 0.4) > X_5)^*0.5 + (X_1 - (X_3/X_8))$

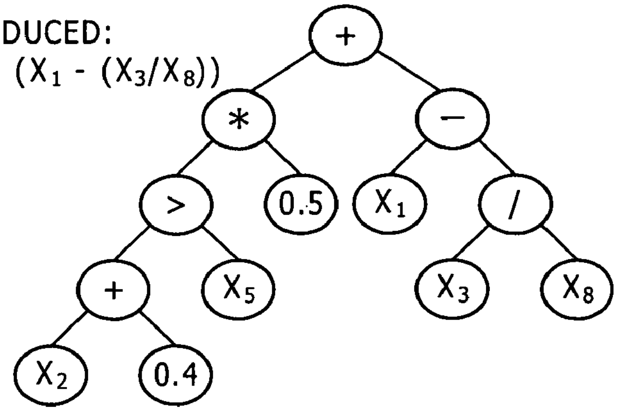

EVALUATION VALUE = CORRELATION BETWEEN TEACHER DATA AND Y OR THE LIKE

INTERSECTION:
INTERSECTING POINT
INTERSECTING POINT

MUTATION:
VARIATION POINT
OTHERS: EXCHANGE OF BROTHER TREE AND SO FORTH

FIG. 35

| |
|---|
| 12Tones, 32#FFT, 16#Mean, 48#StdDev, **32#FFT, Log, 32#FFT**, 32#MaxIndex |
| 12Tones M, 16#UVariance, 32#TimeInmpression_Tone;0.055, **32#FFT, Log, 32#FFT**, Log, 32#IndexLRO |
| Chord, **32#FFT, Log, 32#FFT**, 16#MMean, 32#TimeImpression_Attack;0.471, 32#IndexLR |
| Key, 16#UVariance, 32#Differential, Log, 32#HPF_1;0.358, 32#TimeImpression_Attack;0.376, Log, **32#FFT, Log, 32#FFT**, 3 |
| Key, 32#Differential, **32#FFT, Log, 32#FFT**, 16#FFT, 32#UVariance, 16#IndexLRO |
| Key, 32#TimeImpression_Tone;0.479, Log, 32#TimeImpression_Attack;0.893, 16#FFT, 16#UVariance, 32#TimeImpressi |

FIG. 36

| |
|---|
| 12Tones, 48#UVariance, 32#HPF_1;0.125, Log, 32#Differential, **NewOperator1**, 16#DownSampling;2.371, 32# |
| 12TonesM, 16#Extract1;0.670, **NewOperator1**, 32#IndexLR |
| 12TonesM, 16#HPF_1;0.224, 16#HPF_1;0.407, 32#HPF_1;0.246, 16#FFT, **NewOperator1**, 32#MStdDev, 16#Tim |
| Chord, 16#FFT, **NewOperator1**, 32#TimeImpression_Attack, 0.038, 16#MaxIndex, 32#TimeImpression_Tone |
| Chord, **NewOperator1**, Log, 16#HPF_1;0.226, 16#MMean, 32#Mean |

INFORMATION PROCESSING APPARATUS, INFORMATION PROCESSING METHOD AND PROGRAM

CROSS REFERENCES TO RELATED APPLICATIONS

The present invention contains subject matter related to Japanese Patent Application JP 2005-310407 filed in the Japanese Patent Office on Oct. 25, 2005, the entire contents of which being incorporated herein by reference.

BACKGROUND OF THE INVENTION

1. Field of the Invention

This invention relates to an information processing apparatus, an information processing method and a program, and more particularly an information processing apparatus, an information processing method and a program wherein a characteristic amount of content data is arithmetically operated.

2. Description of the Related Art

An apparatus for automatic production of an algorithm which receives musical piece data as an input and outputs a characteristic amount of the musical piece data such as a speed, brightness or liveliness of the musical piece data has been proposed conventionally. One of such apparatus is disclosed, for example, in U.S. Published Application No. 2004/0181401A1 (hereinafter referred to as Patent Document 1).

SUMMARY OF THE INVENTION

In the apparatus disclosed in Patent Document 1, a characteristic amount extraction algorithm for extracting a characteristic amount from musical piece data and meta data of the musical piece data as seen in FIG. 1 is produced. Thus, depending upon the musical piece, there is the possibility that the characteristic amount calculated in accordance with the algorithm may have a significant error. However, it is difficult to estimate the degree of an error which the calculated characteristic amount.

Accordingly, it is desired to provide a method of estimating an anticipated degree of an error when a characteristic amount is calculated using a produced characteristic amount extraction algorithm.

According to an embodiment of the present invention, an algorithm by which a corresponding characteristic amount can be extracted from content data such as musical piece data is utilized such that an error of the characteristic amount calculated in accordance with the algorithm can be estimated with a high degree of accuracy.

More particularly, according to an embodiment of the present invention, there is provided an information processing apparatus which arithmetically operates a characteristic amount of content data, including first arithmetic operation means for using a low level characteristic amount extraction expression, which receives the content data or meta data corresponding to the content data as an input and outputs a low level characteristic amount, to arithmetically operate the low level characteristic amount, second arithmetic operation means for using a high level characteristic amount extraction expression, which receives the low level characteristic amount arithmetically operated by the first arithmetic operation means as an input and outputs a high level characteristic amount representative of a characteristic of the content data, to arithmetically operate the high level characteristic amount, calculation means for calculating an error between the high level characteristic amount arithmetically operated by the second arithmetic operation means and a high level characteristic amount obtained in advance and corresponding to the content data, production means for producing an error estimation expression, which receives the low level characteristic amount as an input and outputs the error, by learning wherein the error calculated by the calculation means is used as teacher data, and an arithmetic operation control means for applying, when the high level characteristic amount corresponding to the content data is to be acquired, the low level characteristic amount arithmetically operated by the first arithmetic operation means to the error estimation expression produced by the production means to estimate the corresponding error and cause the second arithmetic operation means to arithmetically operate the high level characteristic amount in response to the estimated error.

The calculation means may calculate a square error between the high level characteristic amount arithmetically operated by the second arithmetic operation means and the high level characteristic amount obtained in advance and corresponding to the content data.

The control means may apply, when the high level characteristic amount corresponding to the content data is to be obtained, the low level characteristic amount arithmetically operated by the first arithmetic operation means to the error estimation expression produced by the production means to estimate the corresponding error and cause the second arithmetic operation means to arithmetically operate the high level characteristic amount only when the estimated error is lower than a threshold value.

According to another embodiment of the present invention, there is provided an information processing method for an information processing apparatus which arithmetically operates a characteristic amount of content data, including the steps of using a low level characteristic amount extraction expression, which receives the content data or meta data corresponding to the content data as an input and outputs a low level characteristic amount, to arithmetically operate the low level characteristic amount, using a high level characteristic amount extraction expression, which receives the arithmetically operated low level characteristic amount as an input and outputs a high level characteristic amount representative of a characteristic of the content data, to arithmetically operate the high level characteristic amount, calculating an error between the arithmetically operated high level characteristic amount and a high level characteristic amount obtained in advance and corresponding to the content data, producing an error estimation expression, which receives the low level characteristic amount as an input and outputs the error, by learning wherein the calculated error is used as teacher data, and applying, when the high level characteristic amount corresponding to the content data is to be acquired, the arithmetically operated low level characteristic amount to the produced error estimation expression to estimate the corresponding error and cause the high level characteristic amount to be arithmetically operated in response to the estimated error.

According to a further embodiment of the present invention, there is provided a program for arithmetically operating a characteristic amount of content data, the program causing a computer to execute a process which includes the steps of using a low level characteristic amount extraction expression, which receives the content data or meta data corresponding to the content data as an input and outputs a low level characteristic amount, to arithmetically operate the low level characteristic amount, using a high level characteristic amount extraction expression, which receives the arithmetically operated low level characteristic amount as an input and outputs a high level characteristic amount representative of a characteristic of the content data, to arithmetically operate the high level characteristic amount, calculating an error between the arithmetically operated high level characteristic amount and a high level characteristic amount obtained in advance and corresponding to the content data, producing an error estimation expression, which receives the low level characteristic amount as an input and outputs the error, by learning wherein the calculated error is used as teacher data, and applying, when the high level characteristic amount corresponding to the content data is to be acquired, the arithmetically operated low level characteristic amount to the produced error estimation expression to estimate the corresponding error and cause the high level characteristic amount to be arithmetically operated in response to the estimated error.

In the information processing apparatus and method and the program, a low level characteristic amount extraction expression, which receives content data or meta data corresponding to the content data as an input and outputs a low level characteristic amount, is used to arithmetically operate the low level characteristic amount. Further, a high level characteristic amount extraction expression, which receives the arithmetically operated low level characteristic amount as an input and outputs a high level characteristic amount representative of a characteristic of the content data, is used to arithmetically operate the high level characteristic amount. Then, an error between the arithmetically operated high level characteristic amount and a high level characteristic amount obtained in advance and corresponding to the content data is calculated. Further, an error estimation expression, which receives the low level characteristic amount as an input and outputs the error, is produced by learning wherein the calculated error is used as teacher data. Thereafter, when the high level characteristic amount corresponding to the content data is to be acquired, the arithmetically operated low level characteristic amount is applied to the produced error estimation expression to estimate the corresponding error, and the high level characteristic amount is caused to be arithmetically operated in response to the estimated error.

With the information processing apparatus and method and the program, using an algorithm by which a corresponding characteristic amount can be extracted from content data such as musical piece data, an error of the characteristic amount calculated in accordance with the algorithm can be estimated with a high degree of accuracy.

BRIEF DESCRIPTION OF THE DRAWINGS

FIG. 12 is a view illustrating different examples of input data;

FIGS. 13, 14 and 15 are views illustrating the different input data illustrated in FIG. 12;

FIGS. 21A and 21B are views illustrating arithmetic operation of an operator;

FIGS. 25 to 33A and 33B are diagrammatic views illustrating different examples of a learning algorithm;

FIGS. 35 and 36 are views illustrating different examples of a combination of operators;

DETAILED DESCRIPTION OF THE PREFERRED EMBODIMENT

Before preferred embodiments of the present invention are described in detail, a corresponding relationship between several features set forth in the accompanying claims and particular elements of the preferred embodiments described below is described. The description, however, is merely for the confirmation that the particular elements which support the invention as set forth in the claims are disclosed in the description of the embodiment of the present invention. Accordingly, even if some particular element which is set forth in description of the embodiments is not set forth as one of the features in the following description, this does not signify that the particular element does not correspond to the feature. On the contrary, even if some particular element is set forth as an element corresponding to one of the features, this does not signify that the element does not correspond to any other feature than the element.

Figure 5:
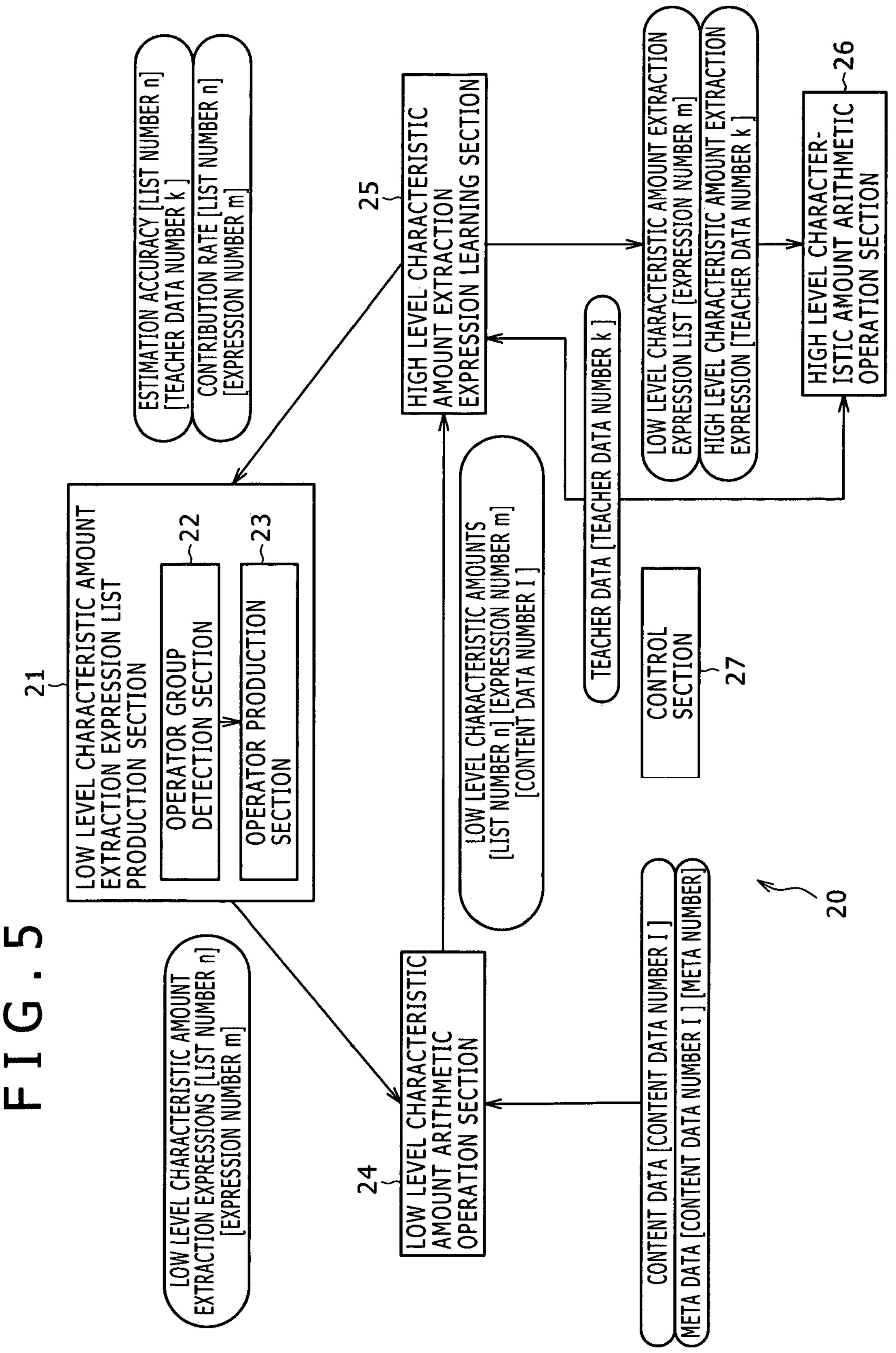
FIG. 5 is a block diagram showing an example of a configuration of the characteristic amount extraction algorithm production apparatus to which the present invention is applied.
Figure 6:
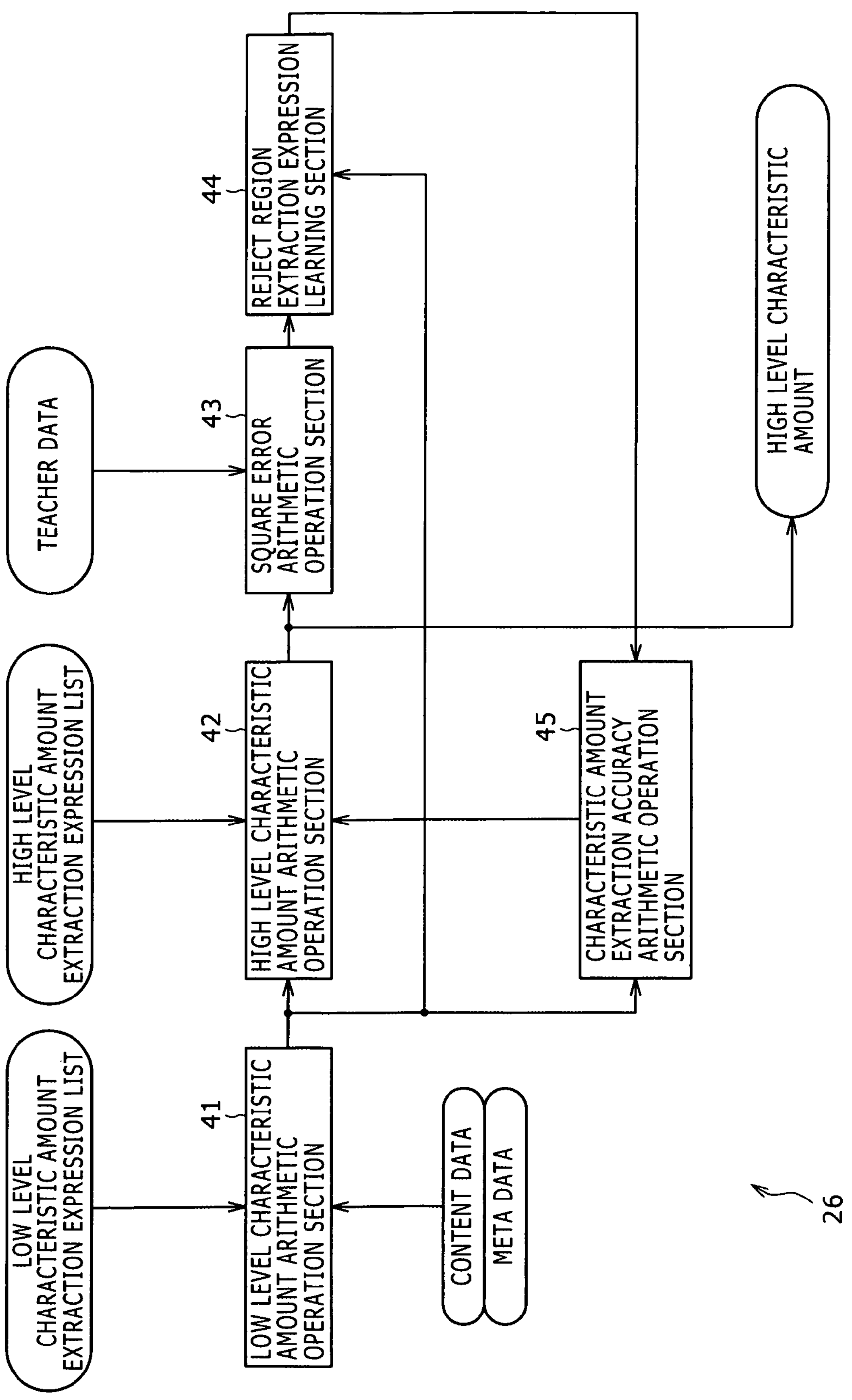
FIG. 6 is a block diagram showing an example of a configuration of a high level characteristic amount arithmetic operation section shown in FIG. 5.

According to an embodiment of the present invention, there is provided an information processing apparatus (for example, a high level characteristic amount arithmetic operation section 26 shown in FIG. 5) which arithmetically operates a characteristic amount of content data, including first arithmetic operation means (for example, a low level characteristic amount arithmetic operation section 41 shown in FIG. 6) for using a low level characteristic amount extraction expression, which receives the content data or meta data corresponding to the content data as an input and outputs a low level characteristic amount, to arithmetically operate the low level characteristic amount, second arithmetic operation means (for example, a high level characteristic amount arithmetic operation section 42 shown in FIG. 6) for using a high level characteristic amount extraction expression, which receives the low level characteristic amount arithmetically operated by the first arithmetic operation means as an input and outputs a high level characteristic amount representative of a characteristic of the content data, to arithmetically operate the high level characteristic amount, calculation means (for example, a square error arithmetic operation section 43 shown in FIG. 6) for calculating an error between the high level characteristic amount arithmetically operated by the second arithmetic operation means and a high level characteristic amount obtained in advance and corresponding to the content data, production means (for example, a reject region extraction expression learning section 44 shown in FIG. 6) for producing an error estimation expression, which receives the low level characteristic amount as an input and outputs the error, by learning wherein the error calculated by the calculation means is used as teacher data, and arithmetic operation control means (for example, a characteristic amount extraction accuracy arithmetic operation section 45 shown in FIG. 6) for applying, when the high level characteristic amount corresponding to the content data is to be acquired, the low level characteristic amount arithmetically operated by the first arithmetic operation means to the error estimation expression produced by the production means to estimate the corresponding error and cause the second arithmetic operation means to arithmetically operate the high level characteristic amount in response to the estimated error.

Figure 38:
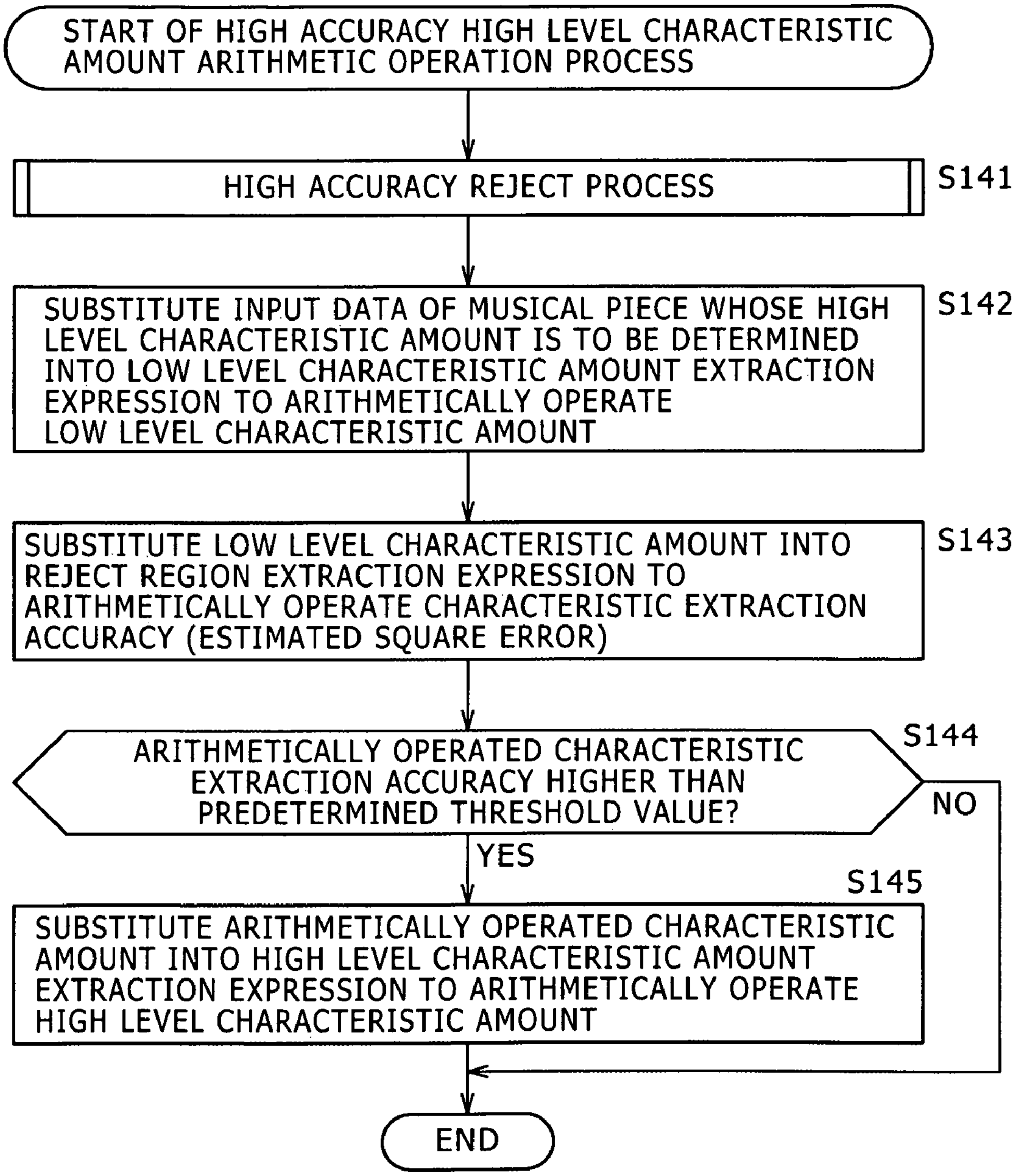
FIG. 38 is a flow chart illustrating a high accuracy high level characteristic amount arithmetic operation process.

According to another embodiment of the present invention, there is provided an information processing method for an information processing apparatus which arithmetically operates a characteristic amount of content data, including the steps of using a low level characteristic amount extraction expression, which receives the content data or meta data corresponding to the content data as an input and outputs a low level characteristic amount, to arithmetically operate the low level characteristic amount, using a high level characteristic amount extraction expression, which receives the arithmetically operated low level characteristic amount as an input and outputs a high level characteristic amount representative of a characteristic of the content data, to arithmetically operate the high level characteristic amount, calculating an error between the arithmetically operated high level characteristic amount and a high level characteristic amount obtained in advance and corresponding to the content data, producing an error estimation expression, which receives the low level characteristic amount as an input and outputs the error, by learning wherein the calculated error is used as teacher data (for example, a step S141 illustrated in FIG. 38), and applying, when the high level characteristic amount corresponding to the content data is to be acquired, the arithmetically operated low level characteristic amount to the produced error estimation expression to estimate the corresponding error and cause the high level characteristic amount to be arithmetically operated in response to the estimated error (for example, steps S144 and S145 illustrated in FIG. 38).

According to a further embodiment of the present invention, there is provided a program for arithmetically operating a characteristic amount of content data, the program causing a computer to execute a process which includes the steps of using a low level characteristic amount extraction expression, which receives the content data or meta data corresponding to the content data as an input and outputs a low level characteristic amount, to arithmetically operate the low level characteristic amount, using a high level characteristic amount extraction expression, which receives the arithmetically operated low level characteristic amount as an input and outputs a high level characteristic amount representative of a characteristic of the content data, to arithmetically operate the high level characteristic amount, calculating an error between the arithmetically operated high level characteristic amount and a high level characteristic amount obtained in advance and corresponding to the content data, producing an error estimation expression, which receives the low level characteristic amount as an input and outputs the error, by learning wherein the calculated error is used as teacher data (for example, a step S141 illustrated in FIG. 38), and applying, when the high level characteristic amount corresponding to the content data is to be acquired, the arithmetically operated low level characteristic amount to the produced error estimation expression to estimate the corresponding error and cause the high level characteristic amount to be arithmetically operated in response to the estimated error (for example, steps S144 and S145 illustrated in FIG. 38).

In the following, a preferred embodiment of the present invention is described in detail with reference to the accompanying drawings.

Figure 1:
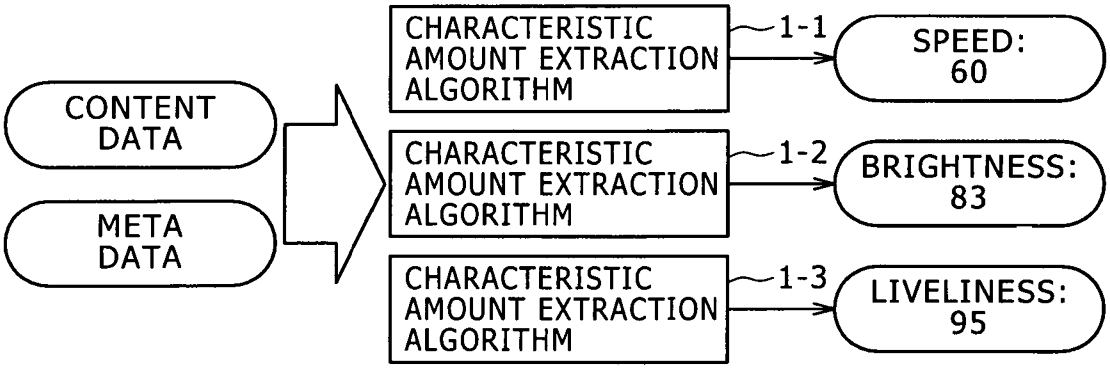
FIG. 1 is a block diagram illustrating a characteristic amount extraction algorithm in the past.
Figure 2:
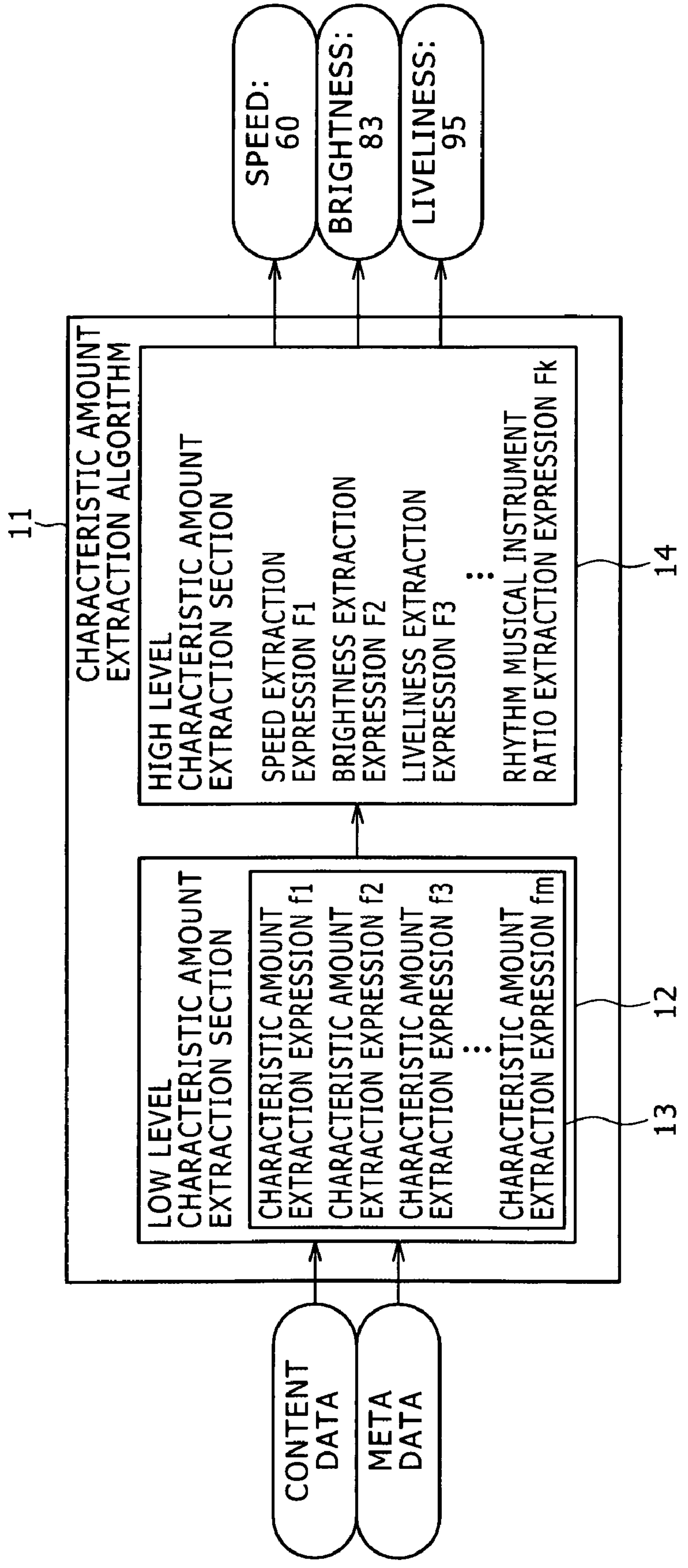
FIG. 2 is a diagrammatic view illustrating an outline of a characteristic amount extraction algorithm produced by a characteristic amount extraction algorithm production apparatus to which the present invention is applied.

FIG. 2 illustrates an outline of a characteristic amount extraction algorithm produced by a characteristic amount extraction algorithm production apparatus 20 (FIG. 5) to which the present invention is applied. Referring to FIG. 2, the characteristic amount extraction algorithm 11 illustrates includes a low level characteristic amount extraction section 12 and a high level characteristic amount extraction section 14. The low level characteristic amount extraction section 12 receives content data, that is, musical piece data, and corresponding meta data, that is, attribute data, as inputs thereto and outputs a low level characteristic amount. The high level characteristic amount extraction section 14 receives the low level characteristic amount from the low level characteristic amount extraction section 12 as an input thereto and outputs a high level characteristic amount.

The low level characteristic amount extraction section 12 has a low level characteristic amount extraction expression list 13 including m low level characteristic amount extraction expressions wherein more than one operator for performing predetermined arithmetic operation for input data are combined. Accordingly, the low level characteristic amount extraction section 12 outputs m different low level characteristic amounts to the high level characteristic amount extraction section 14.

Figure 3A:
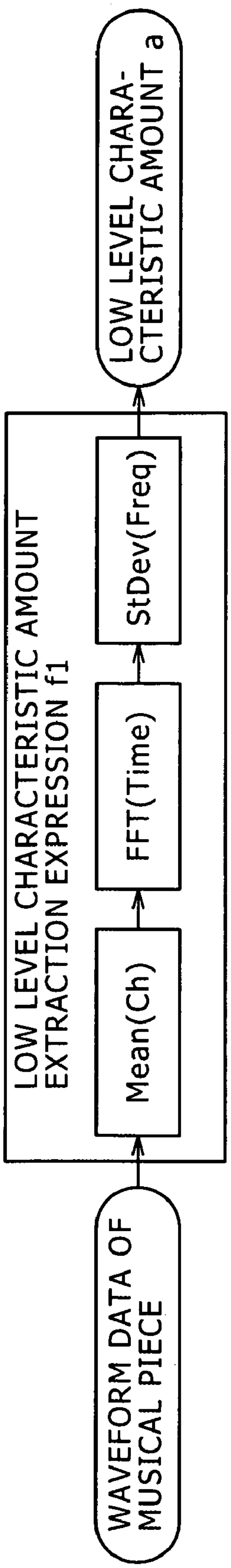
FIGS. 3A and 3B are block diagrams illustrating different examples of a low level characteristic amount extraction expression.
Figure 3B:
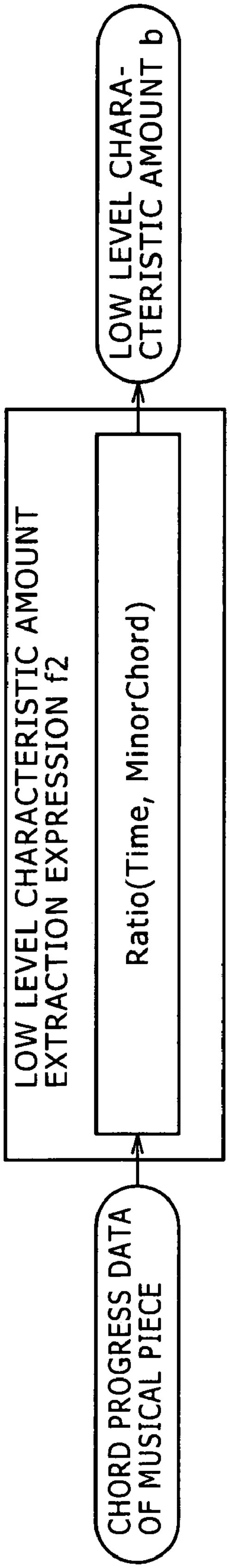

FIGS. 3A and 3B illustrate examples of a low level characteristic amount extraction expression. For example, the low level characteristic amount extraction expression f1 illustrated in FIG. 3A arithmetically operates a mean value (Mean) of waveform data of a musical piece as an input between different channels (for example, an L (Left) channel and an R (Right) channel). Then, the low level characteristic amount extraction expression f1 fast Fourier transforms (FFT) the arithmetically operated mean value along the time axis and then determines a standard deviation (StDev) of frequencies from a result of the FFT. Then, the low level characteristic amount extraction expression f1 outputs a result of the determination as a low level characteristic amount a.

Meanwhile, the low level characteristic amount extraction expression f2 illustrated in FIG. 3B determines an appearance rate (Ratio) of minor codes in chord progress data of a musical piece as an input along the time axis and outputs a result of the determination as a low level characteristic amount b.

It is to be noted that the low level characteristic amount itself which is an output of the low level characteristic amount extraction section 12 is not necessarily a value having some meaning.

Referring back to FIG. 2, the high level characteristic amount extraction section 14 has k high level characteristic amount extraction expressions each for performing comparatively simple arithmetic operation such as four arithmetical operations or power arithmetic operation for more than one of m different low level characteristic amounts inputted to the high level characteristic amount extraction section 14 and for outputting a result of the arithmetic operation as a high level characteristic amount. Accordingly, the high level characteristic amount extraction section 14 outputs k different high level characteristic amounts.

Figure 4A:
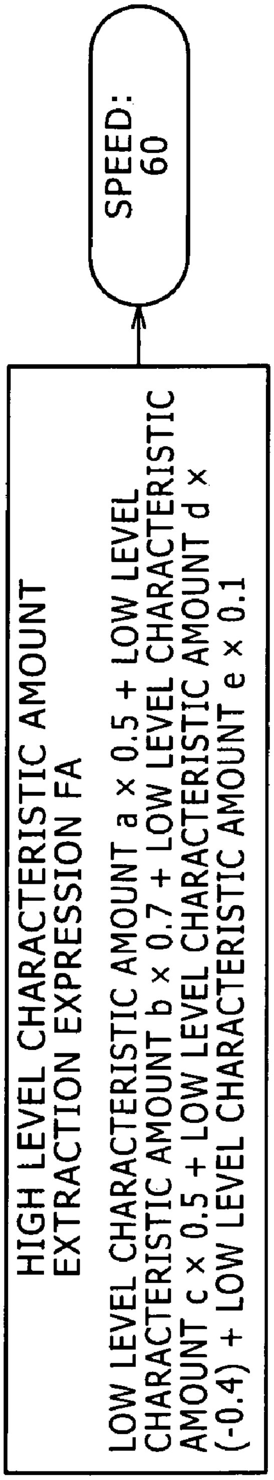
FIGS. 4A and 4B are block diagrams illustrating different examples of a high level characteristic amount extraction expression.
Figure 4B:
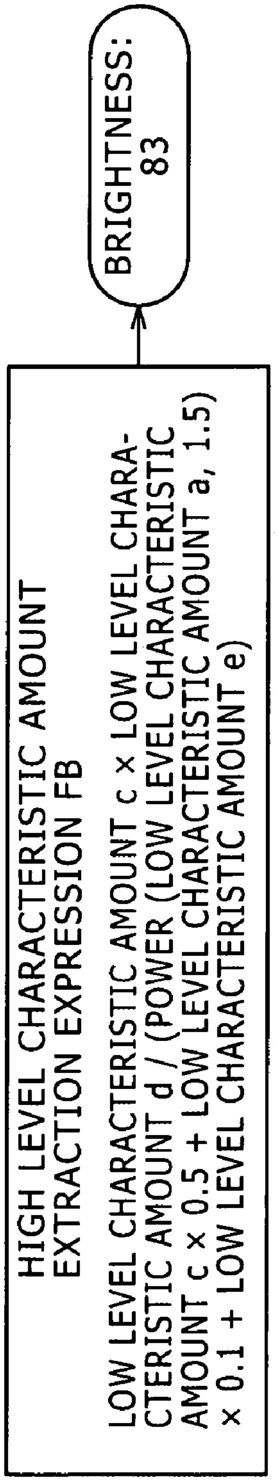

FIGS. 4A and 4B illustrate different examples of a high level characteristic amount extraction expression. For example, the high level characteristic amount extraction expression FA illustrated in FIG. 4A performs four arithmetical operations for low level characteristic amounts a, b, c, d and e and outputs a result of the arithmetical operations as a value of the speed which is one kind of a high level characteristic amount.

Further, for example, the high level characteristic amount extraction expression FB illustrated in FIG. 4B performs four arithmetical operations and power arithmetic operation of the low level characteristic amounts a, c, d and e and outputs a result of the arithmetical operations and power operation as a value of the brightness which is one kind of a high level characteristic amount.

FIG. 5 illustrates an example of a configuration of a characteristic amount extraction algorithm production apparatus 20 to which the present invention is applied. The characteristic amount extraction algorithm production apparatus 20 produces an optimum low level characteristic amount extraction expression and an optimum high level characteristic amount extraction expression by genetic learning. Referring to FIG. 5, the characteristic amount extraction algorithm production apparatus 20 shown includes a low level characteristic amount extraction expression list production section 21, a low level characteristic amount arithmetic operation section 24, a high level characteristic amount extraction expression learning section 25, a high level characteristic amount arithmetic operation section 26, and a control section 27. The low level characteristic amount extraction expression list production section 21 produces n low level characteristic amount extraction expression lists each including m different low level characteristic amount extraction expressions. The low level characteristic amount arithmetic operation section 24 substitutes input data for one musical piece (including content data and meta data) into the n low level characteristic amount extraction expression lists supplied thereto from the low level characteristic amount extraction expression list production section 21 to acquire n groups of m different low level characteristic amounts individually corresponding to the input data. The high level characteristic amount extraction expression learning section 25 estimates a high level characteristic amount extraction expression by learning based on the n groups of outputs from the low level characteristic amount arithmetic operation section 24 and corresponding teacher data (k items of high level characteristic amounts corresponding to one musical piece) from the low level characteristic amount arithmetic operation section 24. The high level characteristic amount arithmetic operation section 26 arithmetically operates a high level characteristic amount using a high level characteristic amount extraction expression produced finally as a result of progress of the learning. The control section 27 controls repetitions (loops) of operation of the components mentioned.

The low level characteristic amount extraction expression list production section 21 produces low level characteristic amount extraction expression lists of the first generation at random. On the other hand, the low level characteristic amount extraction expression list production section 21 produces low level characteristic amount extraction expression lists of the second and succeeding generations based on the accuracy or the like of a high level characteristic amount extraction expression learned using low level characteristic amounts based on low level characteristic amount extraction expression lists of the preceding generation.

An operator group detection section 22 is built in the low level characteristic amount extraction expression list production section 21 and detects a combination of a plurality of operators which appears frequently in produced low level characteristic amount extraction expressions. An operator production section 23 registers the combination of the plural operators detected by the operator group detection section 22 as a new kind of an operator.

The high level characteristic amount extraction expression learning section 25 produces k different high level characteristic amount extraction expressions each corresponding to n groups of low level characteristic amounts. Further, the high level characteristic amount extraction expression learning section 25 calculates an estimation accuracy of the individual high level characteristic amount extraction expressions and contribution rates of the individual low level characteristic amounts in the high level characteristic amount extraction expressions. Then, the high level characteristic amount extraction expression learning section 25 outputs the calculated estimation accuracy and contribution rates to the low level characteristic amount extraction expression list production section 21. Further, the high level characteristic amount extraction expression learning section 25 supplies m low level characteristic amounts of that one of the n groups of low level characteristic amount extraction expression lists which exhibits the highest mean accuracy of resulting high level characteristic amounts in the final generation of learning and corresponding k different high level characteristic amount extraction expressions to the high level characteristic amount arithmetic operation section 26.

The high level characteristic amount arithmetic operation section 26 arithmetically operates a high level characteristic amount using a low level characteristic amount extraction expressions and a high level characteristic amount extraction expressions finally supplied thereto from the high level characteristic amount extraction expression learning section 25.

FIG. 6 shows an example of a detailed configuration of the high level characteristic amount arithmetic operation section 26.

Referring to FIG. 6, the high level characteristic amount arithmetic operation section 26 shown includes a low level characteristic amount arithmetic operation section 41, a high level characteristic amount arithmetic operation section 42, a square error arithmetic operation section 43, a reject region extraction expression learning section 44, and a characteristic amount extraction accuracy arithmetic operation section 45. The low level characteristic amount arithmetic operation section 41 substitutes input data, which is content data and corresponding meta data, into a final low level characteristic amount extraction expression list to arithmetically operate low level characteristic amounts. The high level characteristic amount arithmetic operation section 42 substitutes a result of the arithmetic operation by the low level characteristic amount arithmetic operation section 41 into a final high level characteristic amount extraction expression to arithmetically operate high level characteristic amounts. The square error arithmetic operation section 43 arithmetically operates a square error between a result of the arithmetic operation by the high level characteristic amount arithmetic operation section 42 and teacher data, which is high level characteristic amounts corresponding to input data. The reject region extraction expression learning section 44 produces, by learning, a reject region extraction expression whose input is a low level characteristic amount which is a result of the arithmetic operation of the low level characteristic amount arithmetic operation section 41 and whose output is a square error which is a result of the arithmetic operation of the square error arithmetic operation section 43. The characteristic amount extraction accuracy arithmetic operation section 45 substitutes the input data into the reject region extraction expression produced by the reject region extraction expression learning section 44 to estimate a characteristic extraction accuracy (square error) of the high level characteristic amount arithmetically operated in accordance with the input data. Then, the characteristic amount extraction accuracy arithmetic operation section 45 permits the high level characteristic amount arithmetic operation section 42 to arithmetically operate a high level characteristic amount only when the estimated characteristic extraction accuracy is equal to or higher than a predetermined threshold value.

Now, action of the characteristic amount extraction algorithm production apparatus 20 is described.

Figure 7:
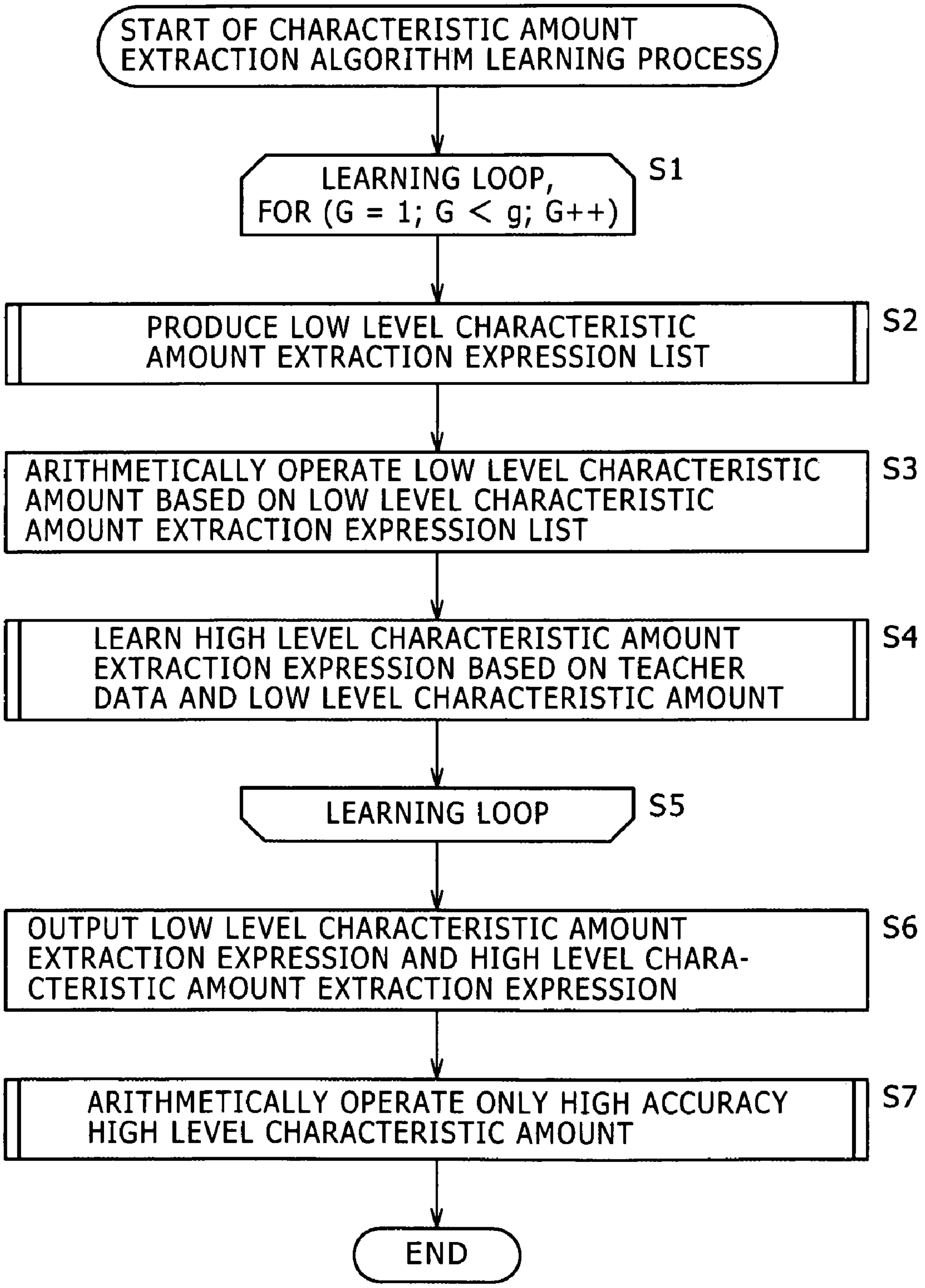
FIG. 7 is a flow chart illustrating a characteristic amount extraction algorithm learning process.

FIG. 7 is a flow chart illustrating a characteristic amount extraction algorithm production process which is basic action of the characteristic amount extraction algorithm production apparatus 20.

Referring to FIG. 7, at step S1, the control section 27 initializes a learning loop parameter G to one and starts a learning loop. The learning loop is repeated by a learning time number g set in advance by the user or the like.

Figure 8:
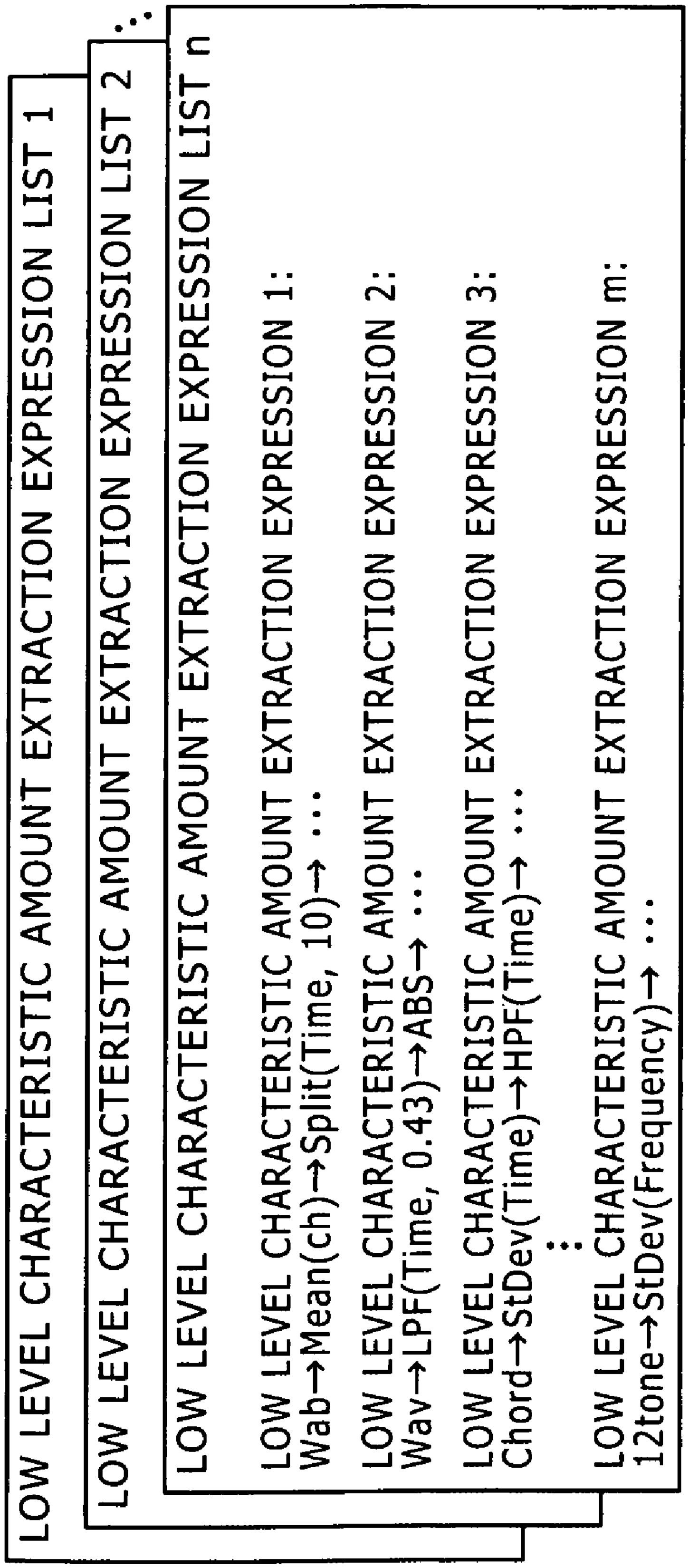
FIG. 8 is a view illustrating an example of a low level characteristic amount extraction expression list.

At step S2, the low level characteristic amount extraction expression list production section 21 produces n low level characteristic amount extraction expression lists each composed of m different low level characteristic amount extraction expressions as seen in FIG. 8. Then, the low level characteristic amount extraction expression list production section 21 outputs, the produced n low level characteristic amount extraction expression lists to the low level characteristic amount arithmetic operation section 24.

Figure 9:
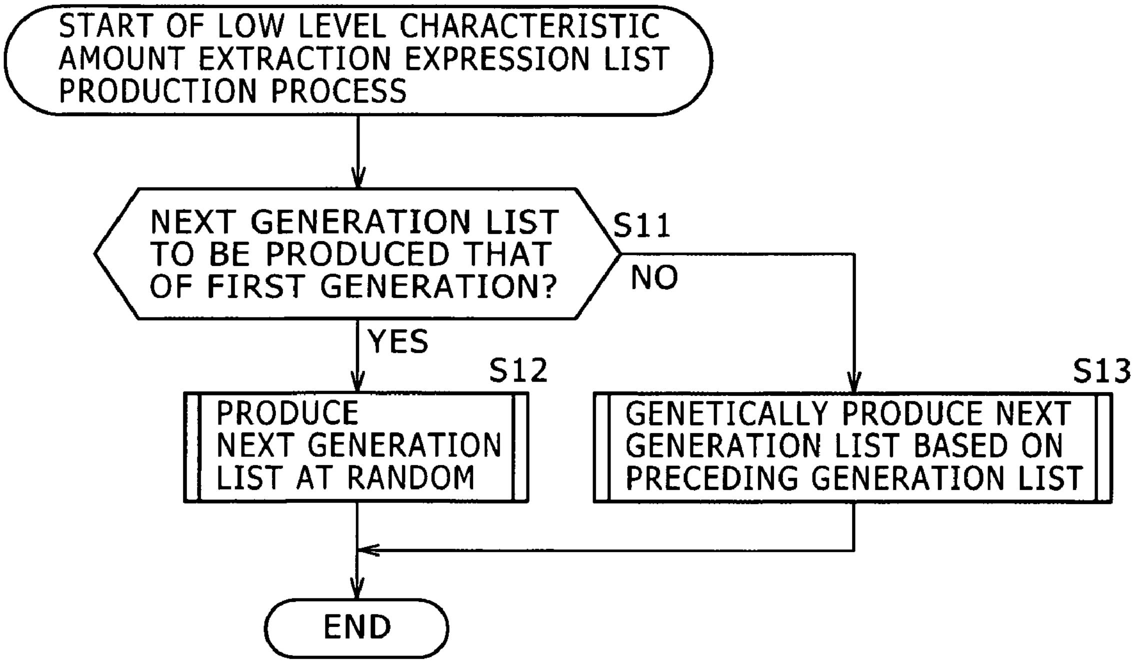
FIG. 9 is a flow chart illustrating a low level characteristic amount extraction expression list production process.

The process at step S2, that is, the low level characteristic amount extraction expression list production process, is described in detail with reference a flow chart of FIG. 9.

At step S11, the low level characteristic amount extraction expression list production section 21 decides whether or not a low level characteristic amount extraction expression list to be reproduced is that of the first generation. It is to be noted that this decision is made such that, when a learning loop parameter G is 0, it is decided that the low level characteristic amount extraction expression list to be produced is that of the first generation. If it is decided that the low level characteristic amount extraction expression list to be reproduced is that of the first generation, then the processing advances to step S12. At step S12, the low level characteristic amount extraction expression list production section 21 produces a low level characteristic amount extraction expression list of the first generation at random.

On the contrary, if it is decided at step S11 that the low level characteristic amount extraction expression list to be produced is not that of the first generation, then the processing advances to step S13. At step S13, the low level characteristic amount extraction expression list production section 21 genetically produces a low level characteristic amount extraction expression list of the next generation based on the low level characteristic amount extraction expression list of the preceding generation.

Figure 10:
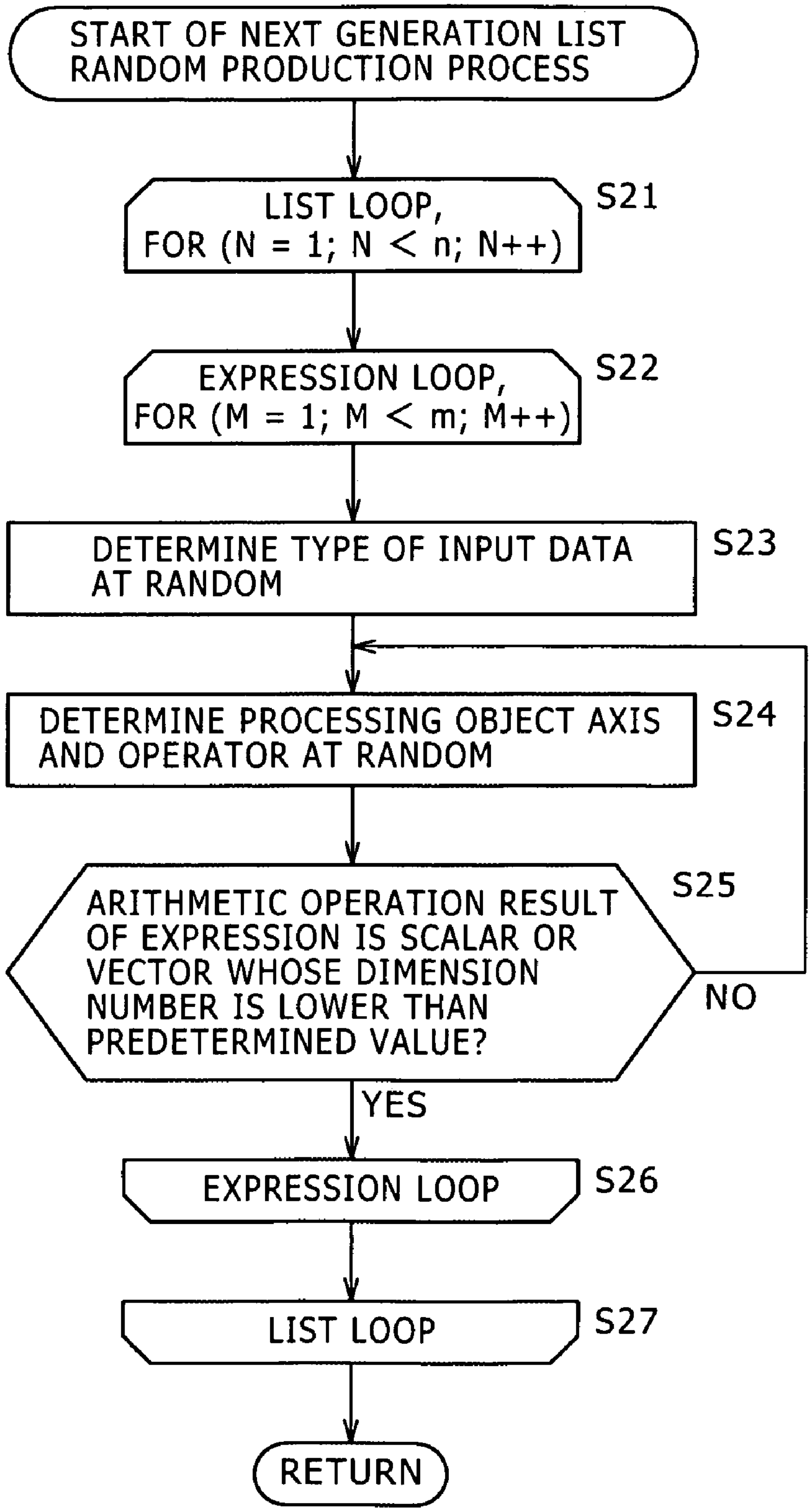
FIG. 10 is a flow chart illustrating a first generation list random production process.

The process at step S12, that is, the first generation list random production process, is described with reference to FIG. 10. At step S21, the control section 27 initializes a list loop parameter N to one and starts a list loop. The list loop is repeated by a number of times equal to a list number n set in advance.

At step S22, the control section 27 initializes an expression loop parameter M to one and starts an expression loop. The expression loop is repeated by a number of times equal to the number m of low level characteristic amount extraction expressions which form one low level characteristic amount extraction expression list.

Here, the describing method of a low level characteristic amount extraction expression to be produced in the expression loop is described with reference to FIG. 11. The low level characteristic amount extraction expression includes input data described at the left end thereof and more than one operator described at the right side of the input data in accordance with an order of arithmetic operation. Each operator suitably includes a processing object axis and a parameter.

Figure 11:
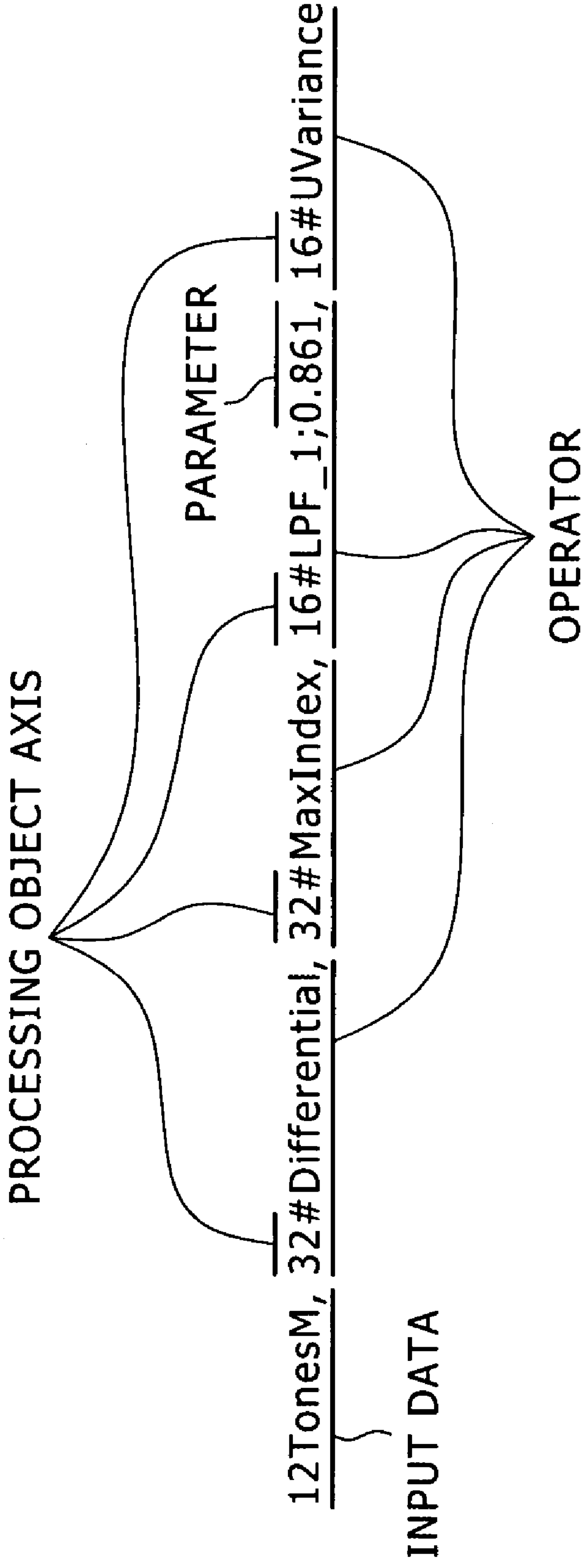
FIG. 11 is a view illustrating a describing method of a low level characteristic amount extraction expression.

For example, in the example illustrated in FIG. 11, 12TonesM is input data, and 32#Differential, 32#MaxIndex, 16#LPF_1;0.861 and so forth are operators. Further, 32#, 16# and so forth in the operators represent processing object axes. For example, 12 TonesM indicates that PCM (pulse coded modulation sound source) waveform data whose input data is monaural data are data of the time axis direction. 48# indicates the channel axis; 32# the frequency axis and the musical interval axis; and 16# the time axis. 0.861 in one of the operators is a parameter in a low-pass filter process and indicates, for example, a threshold value of a frequency to be passed.

Referring back to FIG. 10, at step S23, the low level characteristic amount extraction expression list production section 21 randomly determines input data of the low level characteristic amount extraction expression M of the list N to be produced.

Figures 12, 13:
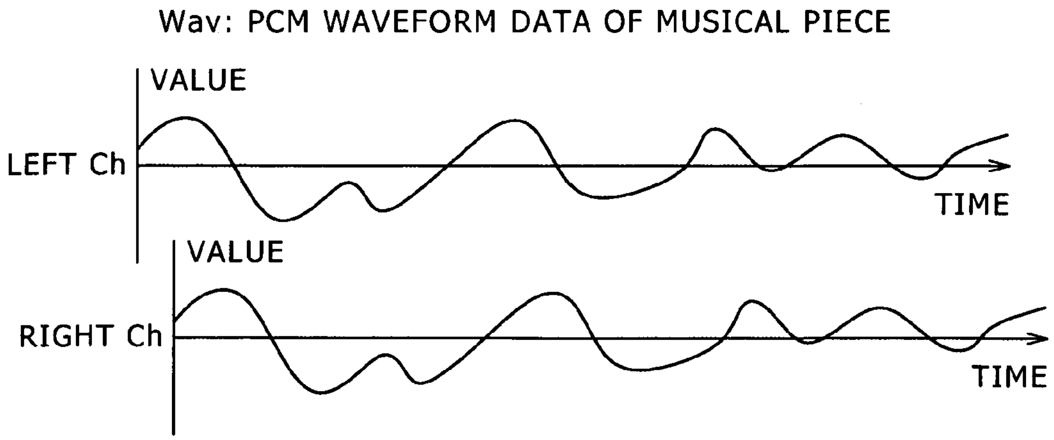

As kinds of the input data, for example, Wav, 12 Tones, chord, and Key illustrated in FIG. 12 and so forth may be available. The Wav of the input data is such PCM waveform data as shown in FIG. 13 and has the time axis and the channel axis as possessing dimensions thereof. The 12 Tones of the input data is a result of an analysis of the PCM waveform data for each musical interval along the time axis and has the time axis and the musical interval axis as possessing dimensions thereof. The Chord of the input data is data representative of such a code progress (C, C#, D, . . . , Bm) of a musical piece as illustrated in FIG. 14 and has the time axis and the musical interval axis as possessing dimensions thereof. The Key of the input data is data representative of a key (C, C#, D, . . . , B) of the musical piece and has the time axis and the musical interval axis as possessing dimensions thereof.

Referring back to FIG. 10, at step S24, the low level characteristic amount extraction expression list production section 21 randomly determines one processing object axis and one parameter of the low level characteristic amount extraction expression M of the list N to be reproduced. As kinds of the parameter, a mean value (Mean), a fast Fourier transform (FFT), a standard deviation (StDev), an appearance rate (Ratio), a low-pass filter (LPF), a high-pass filter (HPF), an absolute value (ABS), a differentiation (Differential), a maximum value (MaxIndex), a universal variance (UVariance) and so forth may be applicable. It is to be noted that, depending upon the operator determined, the processing object axis may possibly be fixed, and in this instance, the processing object axis fixed to the parameter is adopted. Further, if an operator which demands a parameter is determined, then also the parameter is determined to a value set at random or set in advance.

Figure 16:
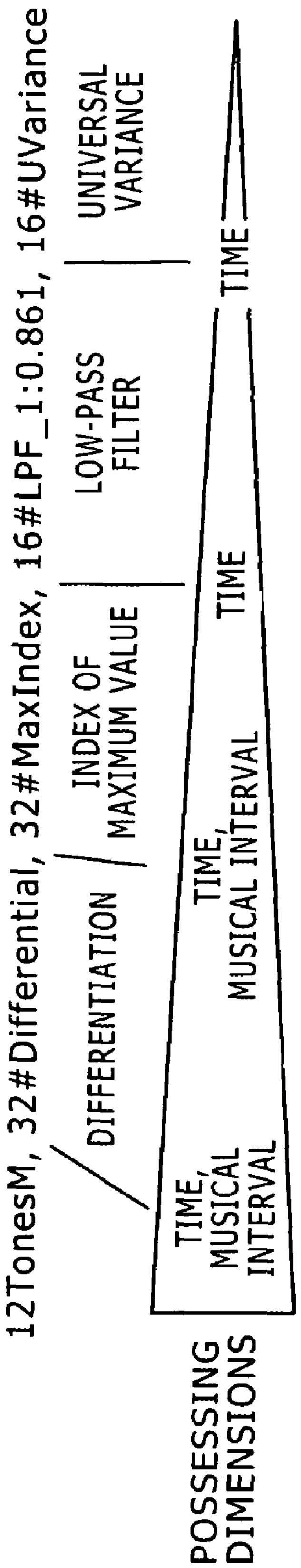
FIG. 16 is a diagrammatic view illustrating possessing dimensions of a low level characteristic amount extraction expression.

At step S25, the low level characteristic amount extraction expression list production section 21 decides whether or not a result of the arithmetic operation of the low level characteristic amount extraction expression M of the list N being reproduced at the present point of time is a scalar value (one dimension) or the number of dimensions of the arithmetic operation result is lower than a predetermined value which is a low value such as, for example, 1 or 2. If a negative decision is made, then the processing returns to step S24, at which one operator is added. Then, if the number of possessing dimensions of the result of the arithmetic operation decreases as seen in FIG. 16 and it is decided at step S25 that the arithmetic operation result of the low level characteristic amount extraction expression M of the list N is a scalar value or the number of dimensions is lower than the predetermined value which is a low value such as 1 or 2, then the processing advances to step S26.

At step S26, the control section 27 decides whether or not the expression loop parameter M is lower than a maximum value m. If the expression loop parameter M is lower than the maximum value m, then the control section 27 increments the maximum value m by one and then returns the processing to step S23. On the contrary, if the expression loop parameter M is not lower than the maximum value m, that is, if the expression loop parameter M is equal to the maximum value m, then the control section 27 quits the expression loop and advances the processing to step S27. By the processes till now, one low level characteristic amount extraction expression list is produced.

At step S27, the control section 27 decides whether or not the list loop parameter N is lower than the maximum value n. If the list loop parameter N is lower than the maximum value n, then the control section 27 increments the list loop parameter N by one and returns the processing to step S22. On the contrary, if the list loop parameter N is not lower than the maximum value n, that is, if the list loop parameter N is equal to the maximum value n, then the control section 27 quits the list loop and ends the first generation list random production process. By the processes till now, n low level characteristic amount extraction expressions of the first generation are produced.

Now, the process at step S13 of FIG. 9, that is, the next generation list genetic production process, is described with reference to FIG. 17. At step S31, the low level characteristic amount extraction expression list production section 21 decides a selection number ns, an intersection number nx and a mutation number nm at random. It is to be noted that the sum of the selection number ns, intersection number nx and mutation number nm is n. Further, a constant set in advance may be adopted for each of the selection number ns, intersection number nx and mutation number nm.

At step S32, the low level characteristic amount extraction expression list production section 21 produces ns low level characteristic amount extraction expression lists based on the determined selection number ns. At step S33, the low level characteristic amount extraction expression list production section 21 produces nx low level characteristic amount extraction expression lists based on the determined intersection number nx. At step S34, the low level characteristic amount extraction expression list production section 21 produces nm low level characteristic amount extraction expression lists based on the determined mutation number nm.

Figure 18:
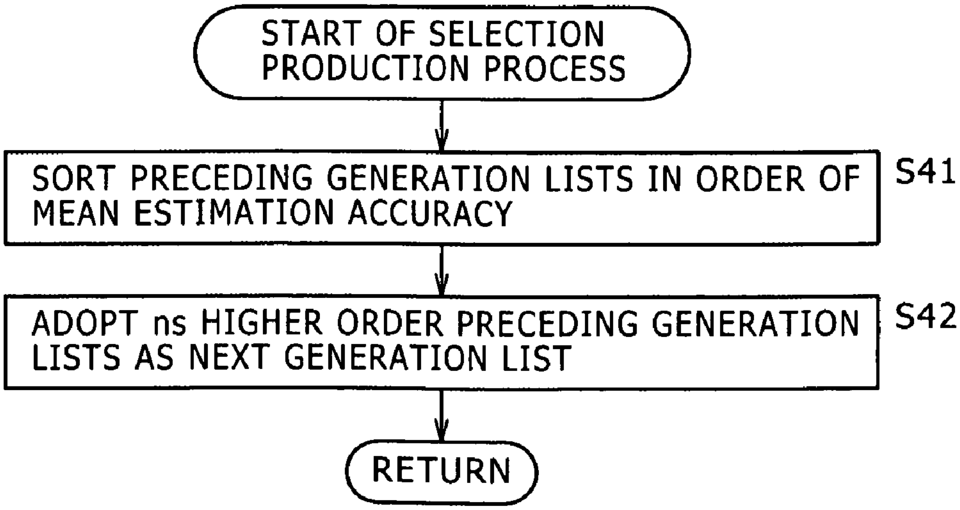
FIG. 18 is a flow chart illustrating a selection production process.

The selection production process at step S32 is described in detail with reference to a flow chart of FIG. 18. By the selection production process, a number of low level characteristic amount extraction expression lists equal to the selection number ns are produced among the n low level characteristic amount extraction expression lists for the next generation.

At step S41, the low level characteristic amount extraction expression list production section 21 re-arranges n low level characteristic amount extraction expression lists of the preceding generation, that is, the generation prior by one generation distance, in a descending order of a mean value of estimation accuracies of high level characteristic amount extraction expressions inputted from the high level characteristic amount extraction expression learning section 25. Then at step S42, the low level characteristic amount extraction expression list production section 21 adopts top ns ones of the re-arranged n low level characteristic amount extraction expression lists of the preceding generation as low level characteristic amount extraction expression lists of the next generation. The selection production process is ended therewith.

Figure 17:
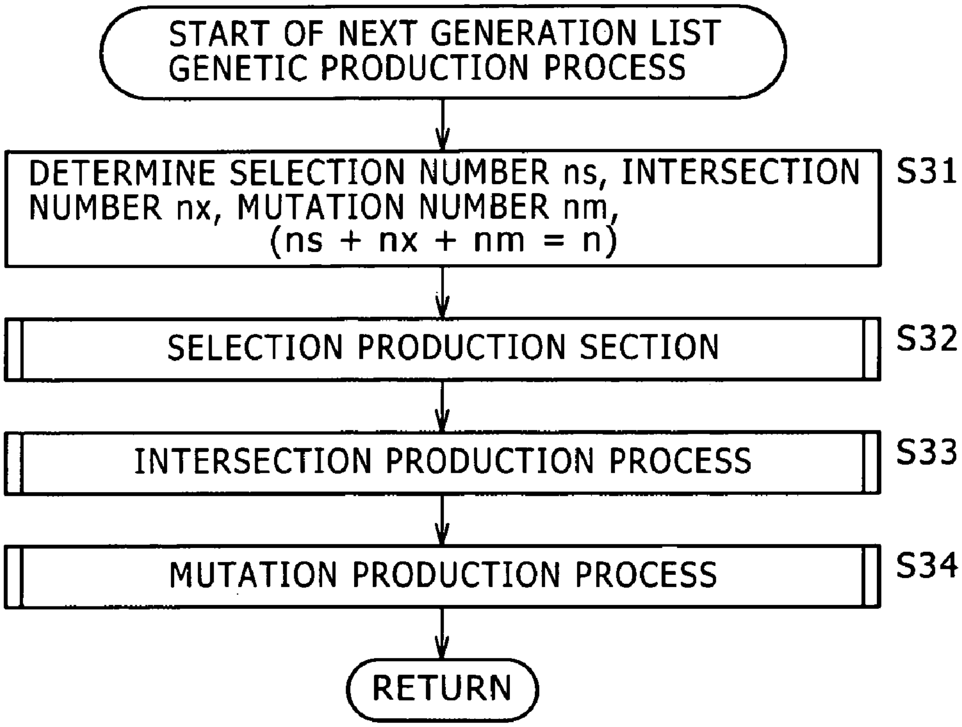
FIG. 17 is a flow chart illustrating a next generation list genetic production process.
Figure 19:
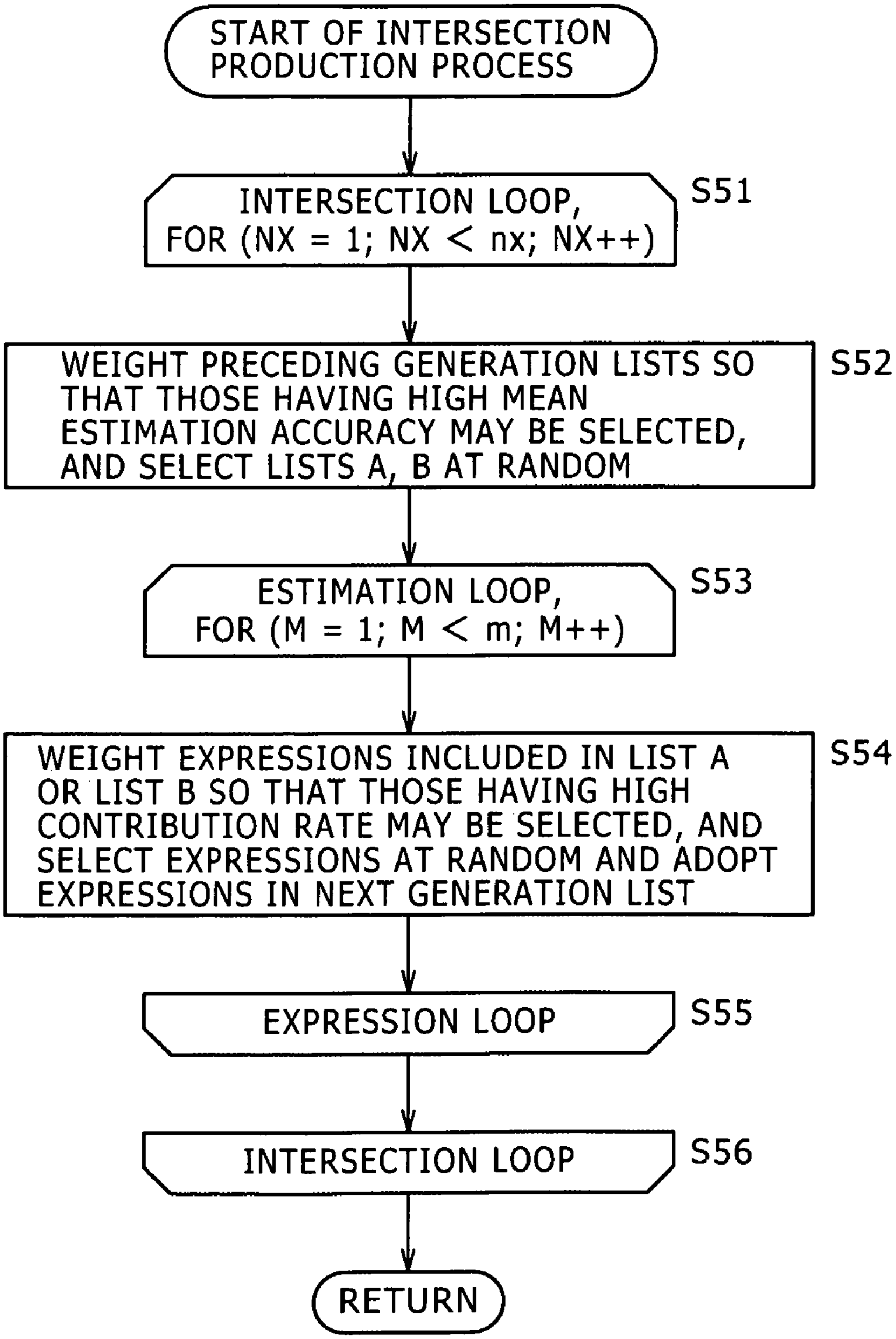
FIG. 19 is a flow chart illustrating an intersection production process.

The intersection production process at step S33 of FIG. 17 is described below with reference to a flow chart of FIG. 19. By the intersection production process, a number of ones equal to the intersection number nx from among the n low level characteristic amount extraction expression lists of the next generation are produced.

At step S51, the control section 27 initializes an intersection loop parameter NX to one and starts an intersection loop. The intersection loop is repeated by a number of times equal to the intersection number nx.

At step S52, the low level characteristic amount extraction expression list production section 21 weights the low level characteristic amount extraction expression lists of the preceding generation so that any low level characteristic amount extraction expression list having a comparatively high mean value of estimation accuracies of high level characteristic amount extraction expressions inputted from the high level characteristic amount extraction expression learning section 25 may be selected preferentially. Then, the low level characteristic amount extraction expression list production section 21 selects two low level characteristic amount extraction expression lists A and B at random. It is to be noted that the selection here may be performed such that the ns low level characteristic amount extraction expression lists selected by the preceding selection production process described above are excepted from candidates for selection or left as candidates for selection.

At step S53, the control section 27 initializes the expression loop parameter M to one and starts an expression loop. The expression loop is repeated by a number of times equal to the number m of expressions included in one low level characteristic amount extraction expression list.

At step S54, the low level characteristic amount extraction expression list production section 21 weights the 2 m low level characteristic amount extraction expressions included in the low level characteristic amount extraction expression lists A and B so that any low level characteristic amount extraction expression having a comparatively high contribution rate in the high level characteristic amount extraction expressions inputted from the high level characteristic amount extraction expression learning section 25 may be selected preferentially. Then, the low level characteristic amount extraction expression list production section 21 selects one low level characteristic amount extraction expression at random and adds the selected low level characteristic amount extraction expression to the low level characteristic amount extraction expression list of the next generation.

At step S55, the control section 27 decides whether or not the expression loop parameter M is lower than the maximum value m. If the expression loop parameter M is lower than the maximum value m, then the control section 27 increments the expression loop parameter M by one and then returns the processing to step S54. On the contrary, if the expression loop parameter M is not lower than the maximum value m, that is, if the expression loop parameter M is equal to the maximum value m, then the control section 27 quits the expression loop and advances the processing to step S56. By the processes till now, one low level characteristic amount extraction expression is produced.

At step S56, the control section 27 decides whether or not the intersection loop parameter NX is lower than the maximum value nx. If the intersection loop parameter NX is lower than the maximum value nx, then the control section 27 increments the intersection loop parameter NX by one and returns the processing to step S52. On the contrary, if the intersection loop parameter NX is not lower than the maximum value nx, that is, if the intersection loop parameter NX is equal to the maximum value nx, then the intersection loop is quitted and the intersection production process is ended. By the processes till now, a number of low level characteristic amount extraction expression lists equal to the intersection number nx are produced.

Figure 20:
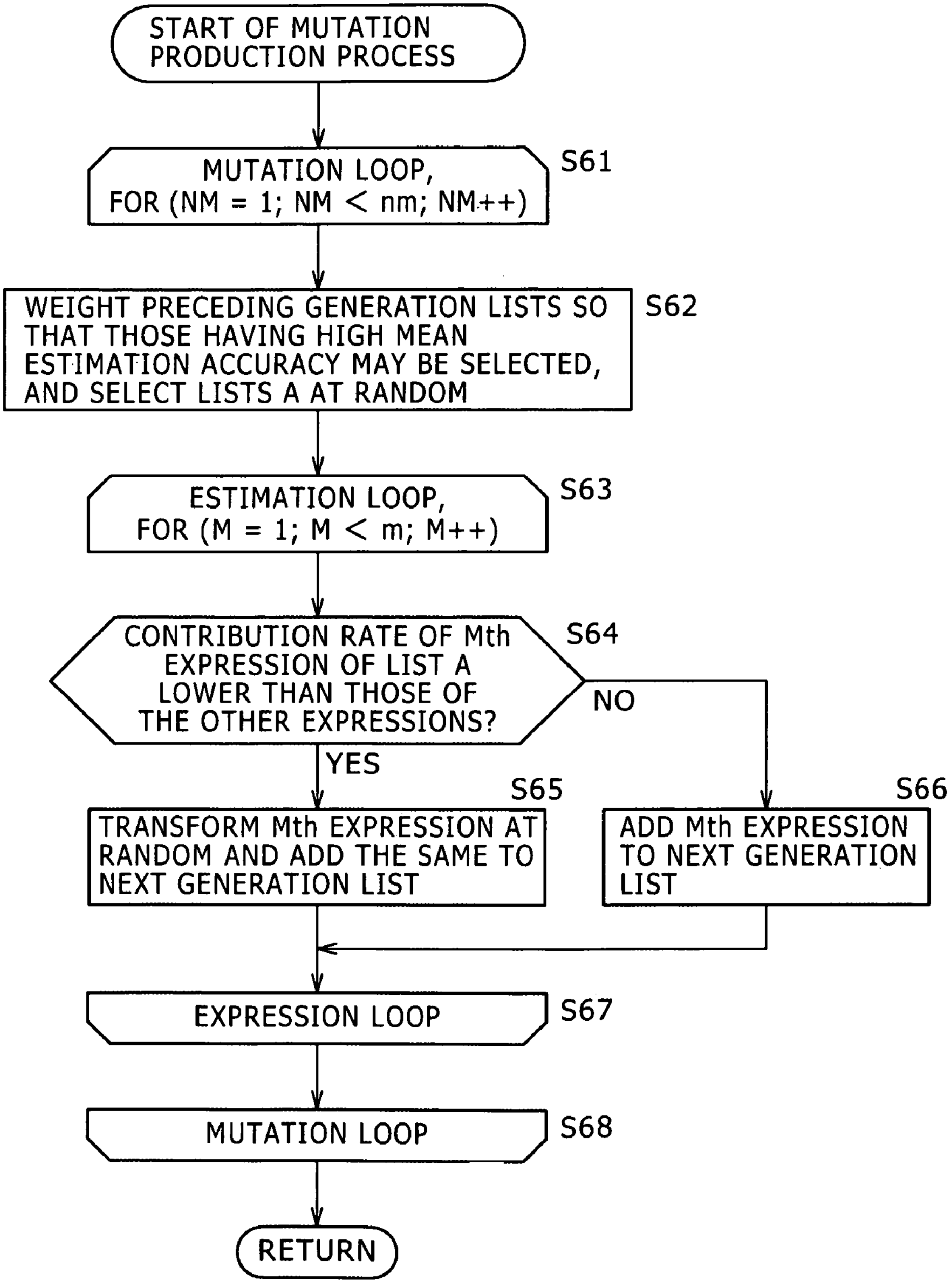
FIG. 20 is a flow chart illustrating a mutation production process.

Now, the mutation production process at step S34 of FIG. 17 is described with reference to a flow chart of FIG. 20. By the mutation production process, a number of low level characteristic amount extraction expression lists equal to the mutation number nm are produced among the n low level characteristic amount extraction expression lists of the next generation.

At step S61, the control section 27 initializes the mutation loop parameter NM to one and starts a mutation loop. The mutation loop is repeated by a number of times equal to the mutation number nm.

At step S62, the low level characteristic amount extraction expression list production section 21 weights the low level characteristic amount extraction expression lists of the preceding generation so that any low level characteristic amount extraction expression list having a comparatively high mean value of estimation accuracies of the high level characteristic amount extraction expressions inputted from the high level characteristic amount extraction expression learning section 25 may be selected preferentially. Then, the low level characteristic amount extraction expression list production section 21 selects one low level characteristic amount extraction expression list A at random. It is to be noted that the selection here may be such that the ns low level characteristic amount extraction expression lists selected by the selection production process described hereinabove are excepted from candidates for selection or left as candidates for selection. Further, the low level characteristic amount extraction expression lists selected by the process at step S52 of the intersection production process described hereinabove may be excepted from candidates for selection or may be left as candidates for selection.

At step S63, the control section 27 initializes the expression loop parameter M to one and starts an expression loop. The expression loop is repeated by a number of times equal to the number m of expressions included in one low level characteristic amount extraction expression list.

At step S64, the low level characteristic amount extraction expression list production section 21 pays attention to the Mth one of the m low level characteristic amount extraction expressions included in the low level characteristic amount extraction expression list A. The low level characteristic amount extraction expression list production section 21 decides whether or not the contribution rate of the low level characteristic amount of an arithmetic operation result of the Mth low level characteristic amount extraction expression is lower than the contribution rates of the low level characteristic amounts which are results of arithmetic operation of the other low level characteristic amount extraction expressions included in the low level characteristic amount extraction expression list A. More particularly, the low level characteristic amount extraction expression list production section 21 decides, for example, whether or not the contribution rate of the low level characteristic amount which is an arithmetic operation result of the Mth low level characteristic amount extraction expression from among the m low level characteristic amount extraction expressions included in the low level characteristic amount extraction expression list A belongs to a range up to a predetermined number in an ascending order.

If it is decided at step S64 that the contribution rate of the low level characteristic amount of the arithmetic operation result of the Mth low level characteristic amount extraction expression is lower than the others, then the processing advances to step S65. At step S65, the low level characteristic amount extraction expression list production section 21 transforms the Mth low level characteristic amount extraction expression at random and adds the transformed low level characteristic amount extraction expression to the low level characteristic amount extraction expression list of the next generation.

On the contrary, if it is decided at step S64 that the contribution rate of the low level characteristic amount of the arithmetic operation result of the Mth low level characteristic amount extraction expression is not lower than the others, then the processing advances to step S66. At step S66, the low level characteristic amount extraction expression list production section 21 adds the Mth low level characteristic amount extraction expression as it is to the low level characteristic amount extraction expression list of the next generation.

At step S67, the control section 27 decides whether or not the expression loop parameter M is lower than the maximum value m. If the expression loop parameter M is lower than the maximum value m, then the control section 27 increments the expression loop parameter M by one and returns the processing to step S64. On the contrary, if the expression loop parameter M is not lower than the maximum value m, that is, if the expression loop parameter M is equal to the maximum value m, then the control section 27 quits the expression loop and advances the processing to step S68. By the processes till now, one low level characteristic amount extraction expression list is produced.

At step S68, the control section 27 decides whether or not the mutation loop parameter NM is lower than the maximum value nm. If the mutation loop parameter NM is lower than the maximum value nm, then the control section 27 increments the mutation loop parameter NM by one and returns the processing step S62. On the contrary, if the mutation loop parameter NM is not lower than the maximum value nm, that is, if the mutation loop parameter NM is equal to the maximum value nm, then the control section 27 quits the mutation loop and ends the mutation production process. By the processes till now, a number of low level characteristic amount extraction expression lists equal to the mutation number nm are produced.

According to the next generation genetic production process described above, those of low level characteristic amount extraction expression lists of the preceding generation which have a comparatively high estimation accuracy and those which have a comparatively high contribution rate corresponding to low level characteristic amount extraction expressions are succeeded, but those which have a comparatively low estimation accuracy or a comparatively low contribution rate are not succeeded by the next generation but are abandoned. Accordingly, it can be expected that, as the generation proceeds, the estimation accuracy of low level characteristic amount extraction expressions is enhanced and also the contribution rate of low level characteristic amount extraction expressions is enhanced.

Referring back to FIG. 7, at step S3, the low level characteristic amount arithmetic operation section 24 substitutes the input data including content data and metal data for one musical piece from among musical pieces C1 to CI into the n low level characteristic amount extraction expression lists inputted from the low level characteristic amount extraction expression list production section 21 to arithmetically operate low level characteristic amounts. It is to be noted that, for each of the input data for one musical piece inputted here, k items of teacher data, that is, corresponding high level characteristic amounts, are obtained in advance. For example, if the low level characteristic amount arithmetic operation section 24 executes arithmetic operation corresponding to the operator of #16Mean for such input data which has the musical interval axis and the time axis as possessing dimensions thereof as seen in FIG. 21A, then it calculates mean values of musical interval values using the time axis as a processing object axis as seen in FIG. 21B.

Figure 22:
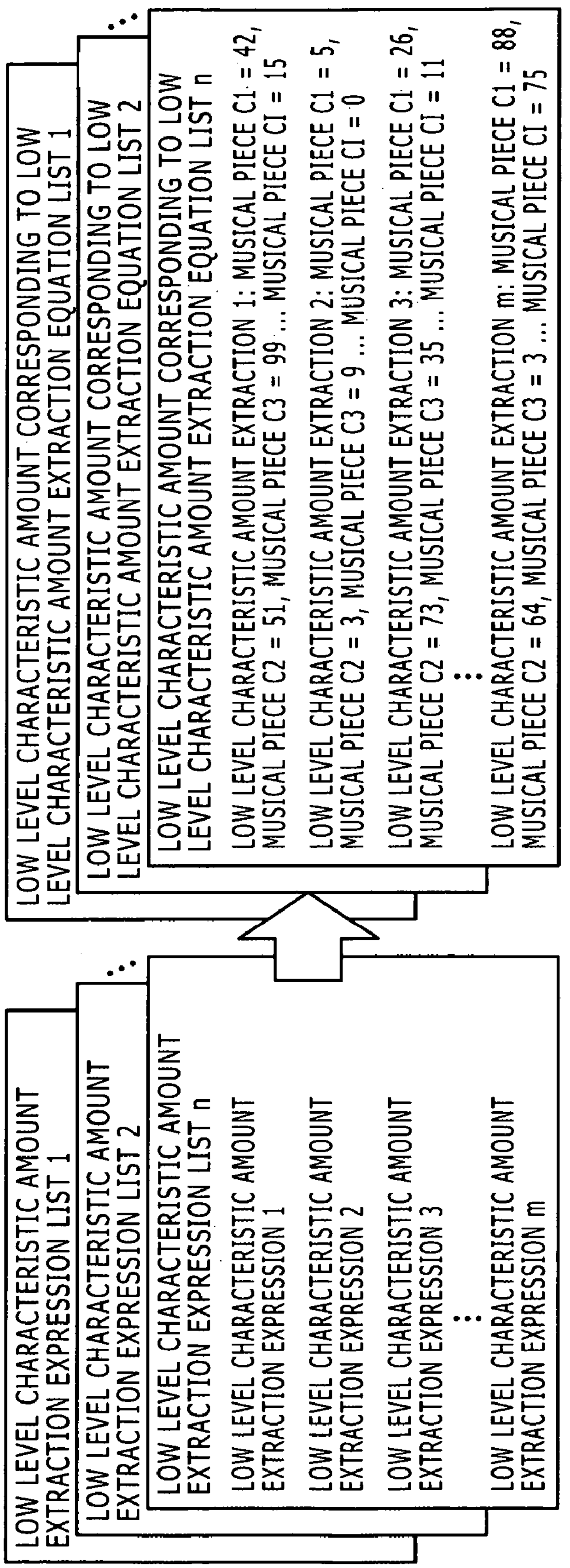
FIG. 22 is a view illustrating a process of a low level characteristic amount arithmetic operation section.

Then, the low level characteristic amount arithmetic operation section 24 outputs m different low level characteristic amounts corresponding to the n sets of input data as seen in FIG. 22 obtained as a result of the arithmetic operation to the high level characteristic amount extraction expression learning section 25.

Figure 23:
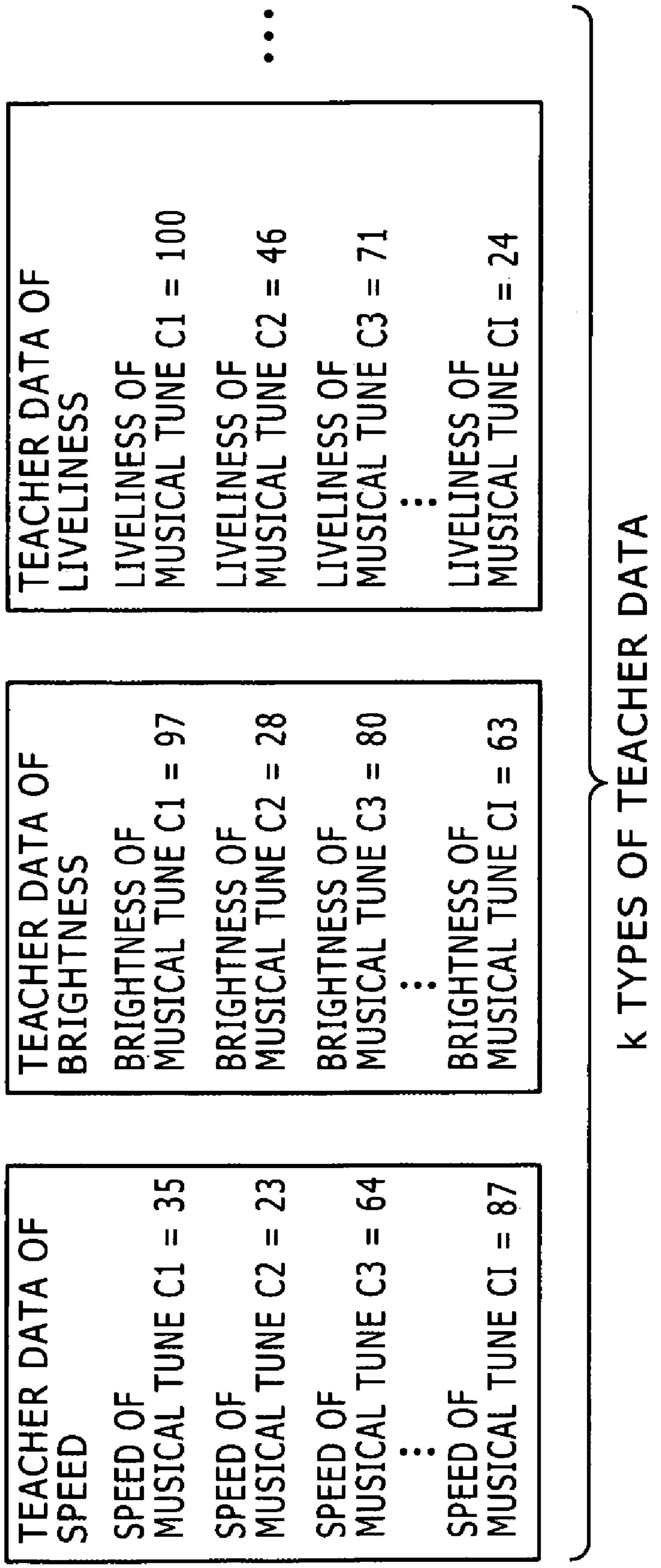
FIG. 23 is a view illustrating an example of teacher data.

Referring back to FIG. 7, at step S4, the high level characteristic amount extraction expression learning section 25 estimates, that is, produces, by learning, n groups of high level characteristic amount extraction expressions based on the n groups of low level characteristic amounts inputted from the low level characteristic amount arithmetic operation section 24 and arithmetically operated corresponding to the input data and corresponding teacher data. The teacher data here are k high level characteristic amounts corresponding to the input data musical pieces C1 to CI as seen in FIG. 23. Further, each of the n groups of high level characteristic amounts includes k high level characteristic amount extraction expressions. The high level characteristic amount extraction expression learning section 25 further calculates the estimation accuracy of each of the high level characteristic amount extraction expressions and the contribution rate of each of the low level characteristic amounts in the high level characteristic amount extraction expressions. Then, the high level characteristic amount extraction expression learning section 25 outputs the calculated estimation accuracy and contribution rates to the low level characteristic amount extraction expression list production section 21.

Figure 24:
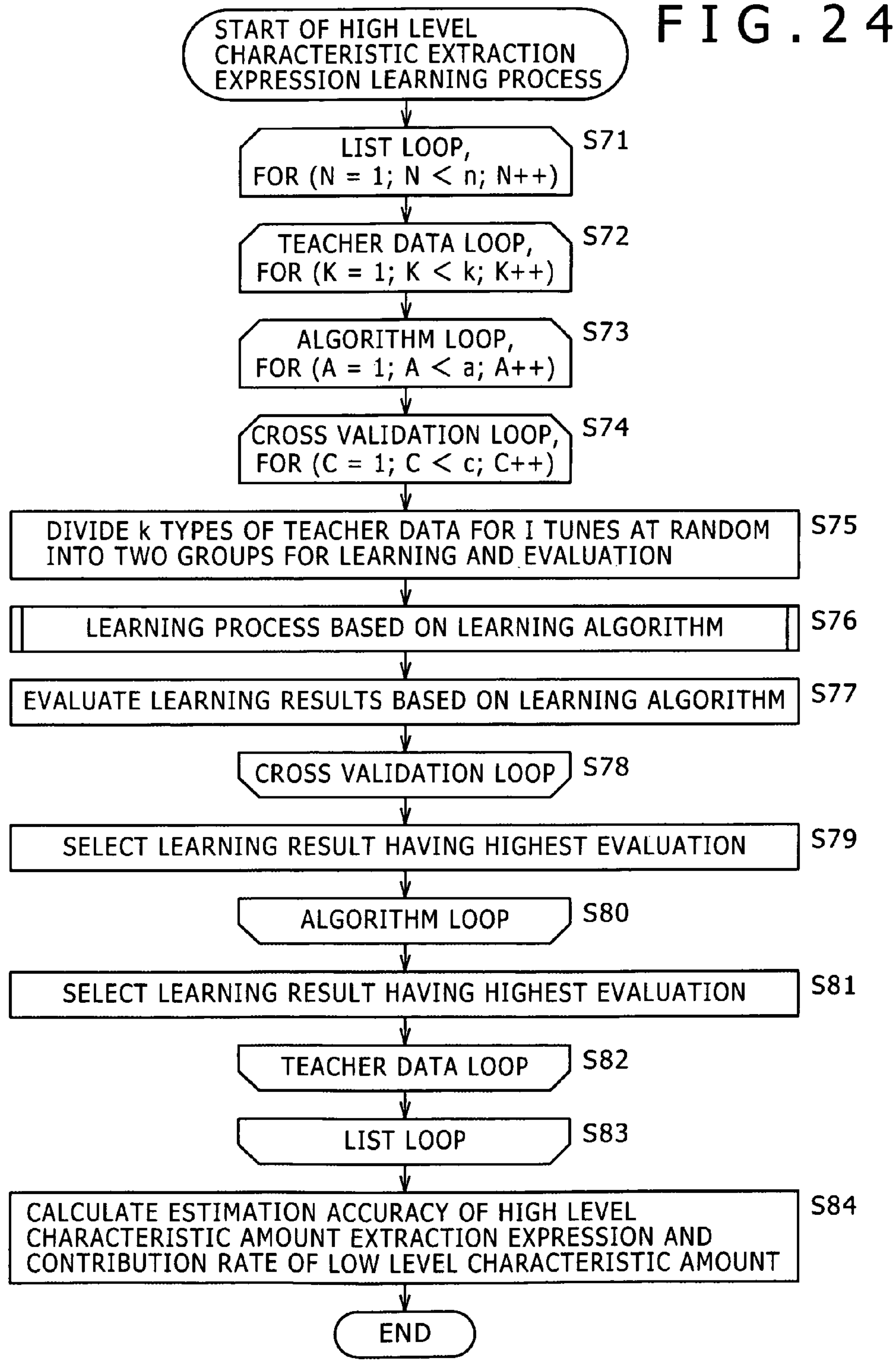
FIG. 24 is a flow chart illustrating a high level characteristic amount extraction expression learning process.

The high level characteristic amount extraction expression learning process at step S4 is described in detail with reference to a flow chart of FIG. 24.

At step S71, the control section 27 initializes the list loop parameter N to one and starts a list loop. The list loop is repeated by a number of times equal to the list number n set in advance. At step S72, the control section 27 initializes a teacher data loop parameter K to one and starts a teacher data loop. The teacher data loop is repeated by a number of times equal to the number k of types of teacher data.

At step S73, the control section 27 initializes an algorithm loop parameter A to one and starts an algorithm loop. The algorithm loop is repeated by a number of times equal to the number a of types of learning algorithms.

As the learning algorithm to be applied, for example, Regression (regression analysis), Classify (classification), SVM (Support Vector Machine) and GP (Genetic Programming) are applicable.

Figure 25:
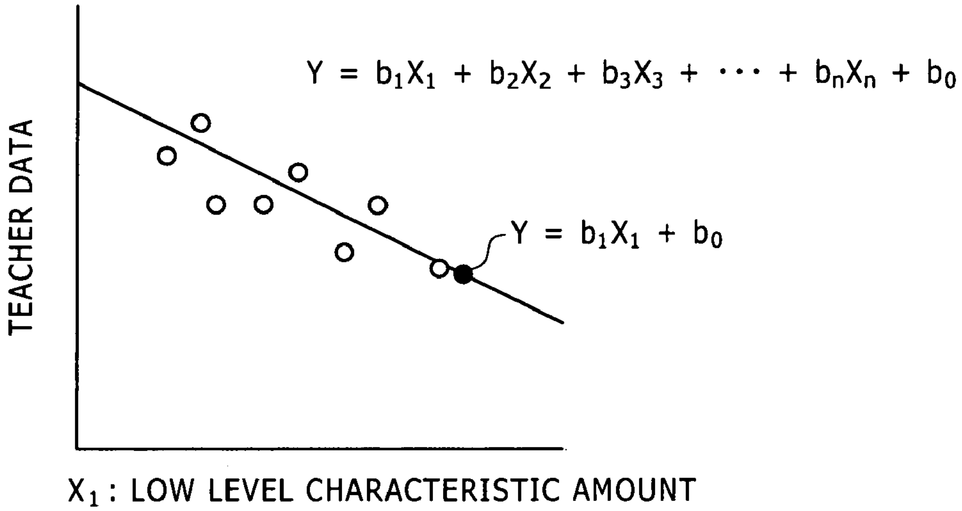
Figure 26:
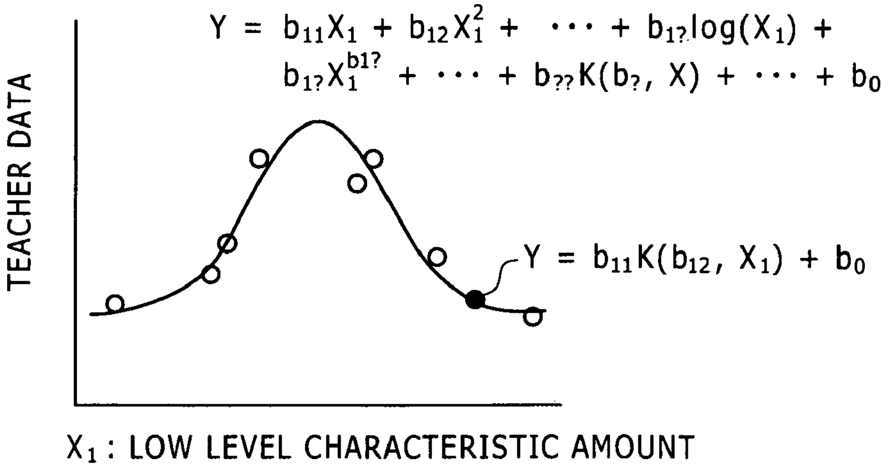

The Regression includes a learning algorithm wherein a parameter $b_n$ is learned so that a square error between teacher data and Y may be minimized based on an assumption that the teacher data and the low level characteristic amount have a linear relationship as seen in FIG. 25. The Regression includes another learning algorithm wherein a parameter $b_{nm}$ is learned so that a square error between teacher data and Y may be minimized based on an assumption that the teacher data and the low level characteristic amount have a non-linear relationship as seen in FIG. 26.

Figure 30A:
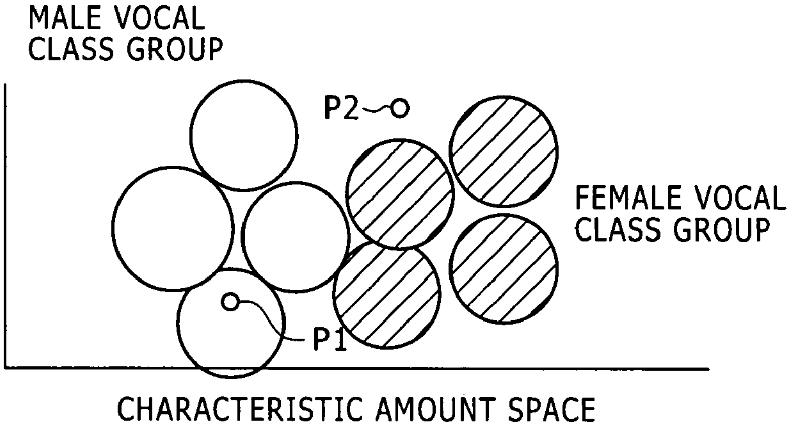
Figure 30B:
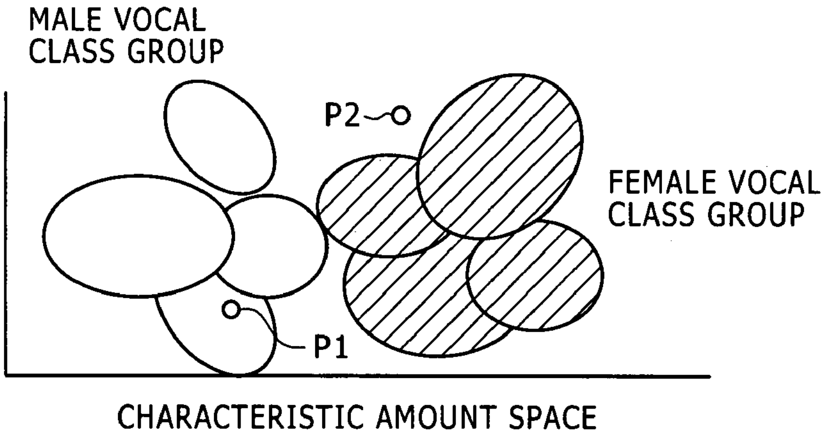

The Classify includes a learning algorithm wherein, as seen in FIG. 27, a Euclidean distance d from the center of each class (in FIG. 27, a male vocal class and a female vocal class) to a low level characteristic amount is calculated and the low level characteristic amount is classified into that class whose Euclidean distance is shortest. The Classify further includes another learning algorithm wherein, as seen in FIG. 28, a correlation correl to a mean vector of each class (in FIG. 28, a male vocal class and a female vocal class) is calculated and the low level characteristic amount is classified into that class whose correl is highest. The Classify further includes a further learning algorithm wherein, as seen in FIG. 29, a Mahalanobis distance d from the center of each class (in FIG. 29, a male vocal class and a female vocal class) is calculated and the low level characteristic amount is classified into that class whose Mahalanobis distance d is shortest. The Classify further includes a learning algorithm wherein, as seen in FIG. 30A, the distribution of each class group (in FIG. 30A, a male vocal class and a female vocal class) is represented by a plurality of classes and the Euclidean distance d from the center of each of the class groups is calculated and then the low level characteristic amount is classified into that class whose Euclidean distance d is shortest. The Classify further includes a learning algorithm wherein, as seen in FIG. 30B, the distribution of each class group (in FIG. 30B, a male vocal class and a female vocal class) is represented by a plurality of classes and the Mahalanobis distance d from the center of each of the class groups is calculated and then the low level characteristic amount is classified into that class whose Mahalanobis distance d is shortest.

The SVM includes a learning algorithm wherein, as seen in FIG. 31, a boundary plane of each class (in FIG. 31, a male vocal class and a female vocal class) is represented by a support vector and the parameter $b_{nm}$ is learned so that the distance (margin) between the separation plane and a vector in the proximity of the boundary may be maximized.

Figures 33A, 33B:
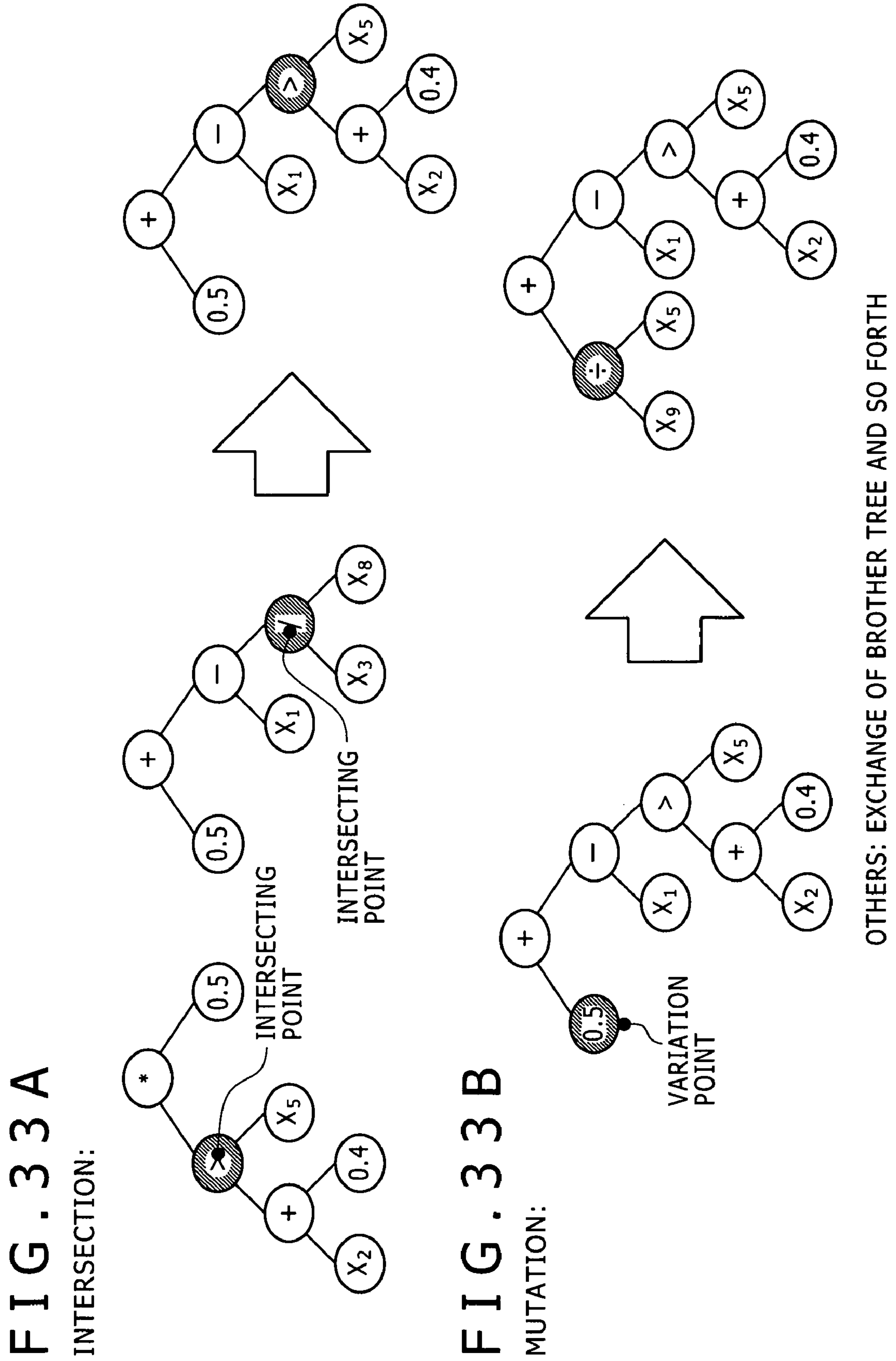

The GP includes a learning algorithm wherein, as shown in FIG. 32, an expression wherein low level characteristic amounts are combined is produced by the GP, another learning method wherein, as shown in FIG. 33A, expressions wherein low level characteristic amounts are combined intersect with each other, and a further learning method wherein, as shown in FIG. 33B, an expression wherein low level characteristic amounts are combined is mutated.

For example, where all learning algorithms described above are used, the number a of kinds of learning algorithms is 11.

Referring back to FIG. 24, at step S74, the control section 27 initializes a cross validation loop parameter C and starts a cross validation loop. The cross validation loop is repeated by a number of times equal to a cross validation time number c set in advance.

At step S75, the high level characteristic amount extraction expression learning section 25 randomly divides teacher data (high level characteristic amounts) for one musical piece of the Kth kind from among the k kinds of learning data into teacher data for learning and teacher data for evaluation (cross validation). In the following description, those teacher data classified as teacher data for learning are referred to as learning data, and those teacher data classified as teacher data for evaluation are referred to as evaluation data.

At step S76, the high level characteristic amount extraction expression learning section 25 applies m different low level characteristic amounts and learning data arithmetically operated using the Nth low level characteristic amount extraction expression list to the ath learning algorithm to estimate high level characteristic amount extraction expressions by learning. Upon such learning, in order to reduce the arithmetic operation amount and suppress overlearning (overfitting), some of the m different low level characteristic amounts are genetically selected and used.

For evaluation values when a low level characteristic amount is to be selected, an information amount reference AIC (Akaike Information Criterion) or an information amount reference BIC (Bayesian Information Criterion) which are functions is used. The information amount reference AIC or BIC is used as a selection reference of a learning model (in the present case, a low level characteristic amount selected) As the value of the information amount reference AIC or BIC decreases, the learning model is considered to be better (evaluated higher).

The information amount reference AIC is represented by the following manner:

$$AIC=-2\times\text{maximum logarithmic likelihood}+2\times\text{free parameter number}$$

For example, where the Regression (linear) is adopted as the learning algorithm (in the case of FIG. 25), the free parameter number=n+1, logarithmic likelihood=−0.5×learning data number×((log 2π)+1+log(mean square error)). Therefore, $$AIC=\text{learning data number}\times((\log 2\pi)+1+\log(\text{mean square error}))+2\times(n+1)$$

The information amount reference BIC is represented in the following expression:

$$BIC=-2\times\text{maximum log arithmetic likelihood}+\log(\text{learning data number})\times\text{free parameter number}$$

For example, where the Regression (linear) is adopted as the learning algorithm (in the case of FIG. 25), BIC=learning data number×((log 2π)+1+log(mean square error))+log (learning data number)×(n+1). The information amount reference BIC is characterized, when compared with the information amount reference AIC, in that, even if the learning data number increases, the value of the information amount reference BIC is not liable to increase.

Figure 34:
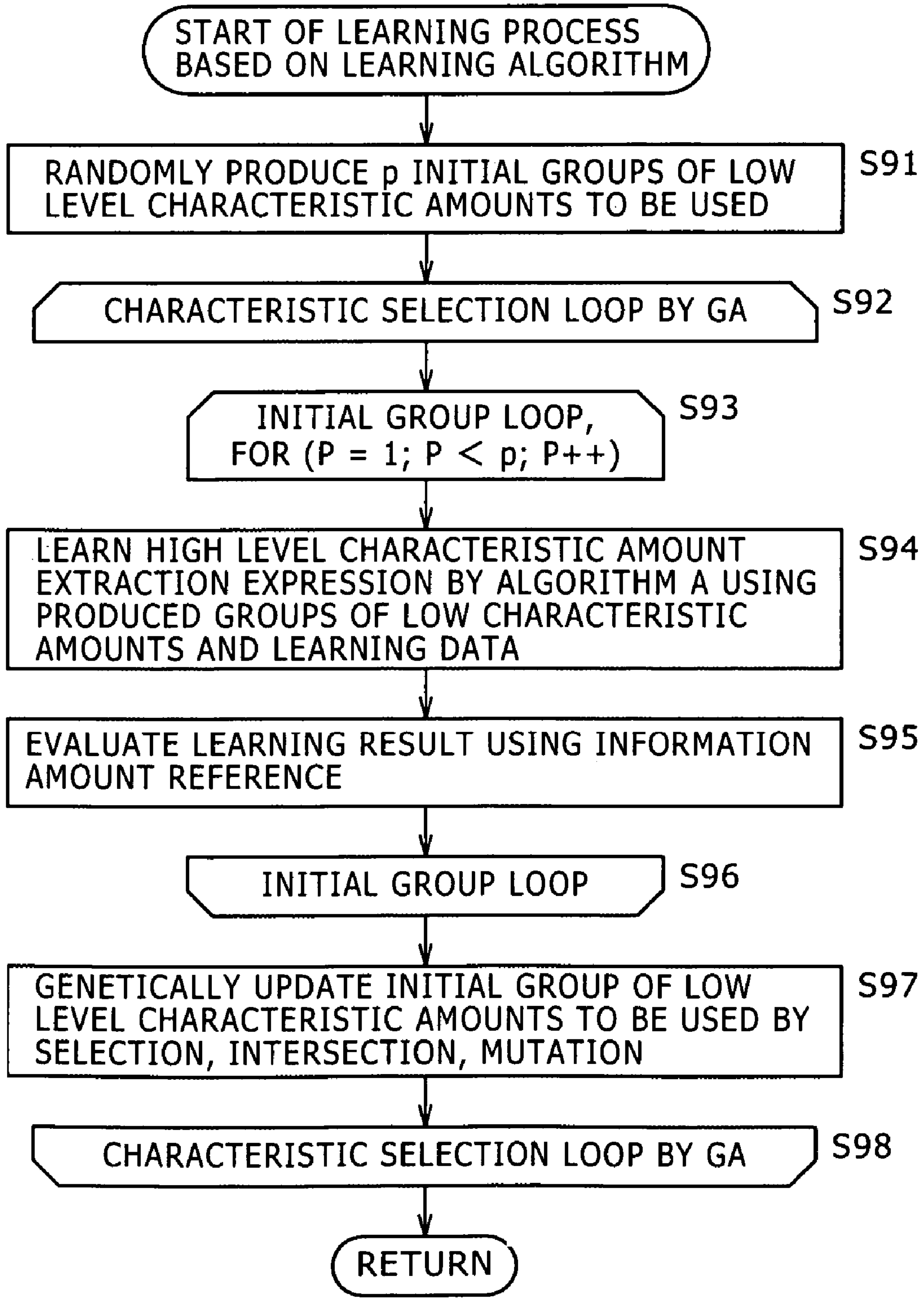
FIG. 34 is a flow chart illustrating a learning process based on the learning algorithm.

Here, the learning process based on a learning algorithm at step S76 is described with reference to FIG. 34. In the learning process, in order to achieve reduction of the arithmetic operation amount and suppression of overlearning (overfitting) as described above, some of the m different low level characteristic amounts are genetically selected and used.

At step S91, the high level characteristic amount extraction expression learning section 25 produces p initial groups each of which is formed by random extraction of those ones of the m different low level characteristic amounts which are to be selected, that is, to be used for learning.

At step S92, the high level characteristic amount extraction expression learning section 25 starts a characteristic selection loop by a genetic algorithm (GA) The characteristic selection loop by the GA is repeated until a predetermined condition is satisfied at step S98 hereinafter described.

At step S93, the control section 27 initializes an initial group loop parameter P to one and starts an initial group loop. The initial group loop is repeated by a number of time equal to the initial group number p of low level characteristic amounts produced by the process at step S91.

At step S94, the high level characteristic amount extraction expression learning section 25 uses and applies low level characteristic amounts included in the Pth initial group and learning data from among teacher data to the ath learning algorithm to estimate high level characteristic amount extraction expressions by learning.

At step S95, the high level characteristic amount extraction expression learning section 25 arithmetically operates an information amount reference AIC or BIC as an evaluation value of the high level characteristic amounts obtained as a result of the process at step S94. At step S96, the control section 27 decides whether or not the initial group loop parameter P is lower than the maximum value p. If the initial group loop parameter P is lower than the maximum value p, then the control section 27 increments the initial group loop parameter P by one and returns the processing to step S94. On the contrary if the initial group loop parameter P is not lower than the maximum value p, that is, if the initial group loop parameter P is equal to the maximum value p, then the control section 27 quits the initial group loop and advances the processing to step S97. By the initial group loop, information reference amounts can be obtained as evaluation values of high level characteristic amount extraction expressions learned based on the initial groups.

At step S97, the high level characteristic amount extraction expression learning section 25 genetically updates the p initial groups each formed from low level characteristic amounts to be used for leaning based on the evaluation values (information amount references). More particularly, the initial groups are updated by selection, intersection and mutation similarly as at steps S32 to S34 of FIG. 17. By this updating, learning by which the initial groups initially produced at random enhance the evaluation value of the high level characteristic amount extraction expressions is advanced.

At step S98, the control section 27 returns the processing to step S93 every time while the evaluation value of that one of the high level characteristic amount extraction expressions corresponding to the p initial groups which has the highest evaluation value, that is, which has the smallest information reference amount exhibits enhancement every time the characteristic selection loop by the GA is repeated, that is, while the information reference amount continues to decrease. On the other hand, the control section 27 quits the characteristic selection loop by the GA if the evaluation value of that one of the high level characteristic amount extraction expressions corresponding to the p initial groups which has the highest evaluation value does not exhibit enhancement any more even if the characteristic selection loop by the GA is repeated, that is, if the information reference amount does not decrease any more. Then, the control section 27 outputs the high level characteristic amount extraction expression which has the highest evaluation value to a process at a succeeding stage, that is, to a process at step S77 of FIG. 24. Then, the learning process based on the learning algorithm is ended.

Referring back to FIG. 24, at step S77, the high level characteristic amount extraction expression learning section 25 evaluates the high level characteristic amount extraction expression obtained by the process at step S76 using the evaluation data. In particular, the high level characteristic amount extraction expression learning section 25 arithmetically operates a high level characteristic amount using the obtained high level characteristic amount extraction expression and calculates a square error between the high level characteristic amount and the evaluation data.

At step S78, the control section 27 decides whether or not the cross validation loop parameter C is lower than the maximum value c. If the cross validation loop parameter C is lower than the maximum value c, then the control section 27 increments the cross validation loop parameter C by one and returns the processing to step S75. On the contrary, if the cross validation loop parameter C is not lower than the maximum value c, that is, if the cross validation loop parameter C is equal to the maximum value c, then the control section 27 quits the cross validation loop and advances the processing to step S79. By the processes till now, c learning results, that is, c high level characteristic amount extraction expressions, are obtained. Since learning data and evaluation data are converted at random by the cross validation loop, it can be confirmed that the high level characteristic amount extraction expressions are not overlearned.

At step S79, the high level characteristic amount extraction expression learning section 25 selects that one of the c learning results obtained by the cross validation result, that is, the c high level characteristic amount extraction expressions, which has the highest evaluation value in the process at step S77.

At step S80, the control section 27 decides whether or not the algorithm loop parameter A is lower than the maximum value a. If the algorithm loop parameter A is lower than the maximum value a, then the control section 27 increments the algorithm loop parameter A by one and returns the processing to step S74. On the contrary, if the algorithm loop parameter A is not lower than the maximum value a, that is, if the algorithm loop parameter A is equal to the maximum value a, then the control section 27 quits the algorithm loop and advances the processing to step S81. By the algorithm loop, a high level characteristic amount extraction expressions of the kth kind learned by the learning algorithm of the kind A. Therefore, at step S81, the high level characteristic amount extraction expression learning section 25 selects that one of the a learning results obtained by the algorithm loop, that is, the a high level characteristic amount extraction expressions, which has the highest evaluation value in the process at step S77.

At step S82, the control section 27 decides whether or not the teacher data loop parameter K is lower than a maximum value k. If the teacher data loop parameter K is lower than the maximum value k, then the control section 27 increments the teacher data loop parameter K by one and returns the processing to step S73. On the contrary, if the teacher data loop parameter K is not lower than the maximum value k, that is, if the teacher data loop parameter K is equal to the maximum value k, then the control section 27 quits the teacher data loop and advances the processing to step S83. By the teacher data loop, k different high level characteristic amount extraction expressions corresponding to the Nth low level characteristic amount extraction expression list are obtained.

At step S83, the control section 27 decides whether or not the list loop parameter N is lower than the maximum value n. If the list loop parameter N is lower than the maximum value n, then the control section 27 increments the list loop parameter N by one and returns the processing to step S72. On the contrary, if the list loop parameter N is not lower than maximum value n, that is, if the list loop parameter N is equal to the maximum value n, then the control section 27 quits the list loop and advances the processing to step S84. By the list loop, k different high level characteristic amount extraction expressions corresponding to n low level characteristic amount extraction expressions are obtained.

At step S84, the high level characteristic amount extraction expression learning section 25 calculates an estimation accuracy of the k different high level characteristic amount extraction expressions and contribution rates of the low level characteristic amounts in the high level characteristic amount extraction expressions, which correspond to the n low level characteristic amount extraction expressions obtained as described above. Then, the high level characteristic amount extraction expression learning section 25 outputs the calculated estimation accuracy and contribution rates to the low level characteristic amount extraction expression list production section 21. The high level characteristic amount extraction expression learning process is ended therewith.

Referring back to FIG. 7, at step S5, the control section 27 decides whether or not the learning loop parameter G is lower than the maximum value g. If the learning loop parameter G is lower than the maximum value g, then the control section 27 increments the learning loop parameter G by one and returns the processing to step S2. On the contrary, if the learning loop parameter G is not lower than the maximum value g, that is, if the learning loop parameter G is equal to the maximum value g, the control section 27 quits the learning loop and advances the processing to step S6. It is to be noted that the learning loop at steps S1 to S5 is a learning process of a characteristic amount extraction algorithm, and the step S6 later than the step S5 is for a process for arithmetic operation of a high level characteristic amount using the characteristic amount extraction algorithm.

At step S6, the high level characteristic amount extraction expression learning section 25 supplies m low level characteristic amount extraction expressions of the list which has the highest mean accuracy of the obtained high level characteristic amounts from among the n low level characteristic amount extraction expression lists in the final generation of learning and k different high level characteristic amount extraction expressions corresponding to the m low level characteristic amount extraction expressions to the high level characteristic amount arithmetic operation section 26. At step S7, the high level characteristic amount arithmetic operation section 26 arithmetically operates a high level characteristic amount using the low level characteristic amount extraction expression and the high level characteristic amount extraction expression supplied finally from the high level characteristic amount extraction expression learning section 25. It is to be noted that the process at step S7 is hereinafter described with reference to FIG. 38 and so forth.

The description of the characteristic amount extraction algorithm production process by the characteristic amount extraction algorithm production apparatus 20 is ended therewith.

Now, a new operator production process is described which is executed when the learning loop at steps S1 to S6 of the characteristic amount extraction algorithm production process described hereinabove is repeated to progress and grow the generation of low level characteristic amount extraction expression lists. In other words, the new operator production process is executed when the contribution rate of low level characteristic amount extraction expressions is enhanced or when the estimation accuracy of corresponding high level characteristic amount extraction expressions is enhanced.

As the generation of low level characteristic amount extraction expression lists proceeds and grows, in the low level characteristic amount extraction expression lists, a permutation of a plurality of operators (hereinafter referred to as combination of operators) comes to frequently appear in different low level characteristic amount extraction expressions. Therefore, a combination of a plurality of operators which appears frequently in different low level characteristic amount extraction expressions is registered as one of new operators to be used by the low level characteristic amount extraction expression list production section 21.

For example, in an example illustrated in FIG. 35, a combination of three operators "32#FFT, Log, 32#FFT" appears in five low level characteristic amount extraction expressions. Where the "32#FFT, Log, 32#FFT" is registered as one operator NewOperator1, the operator NewOperator1 is included in low level characteristic amount extraction expressions of the next and succeeding generations, for example, as seen in FIG. 36.

Figure 37:
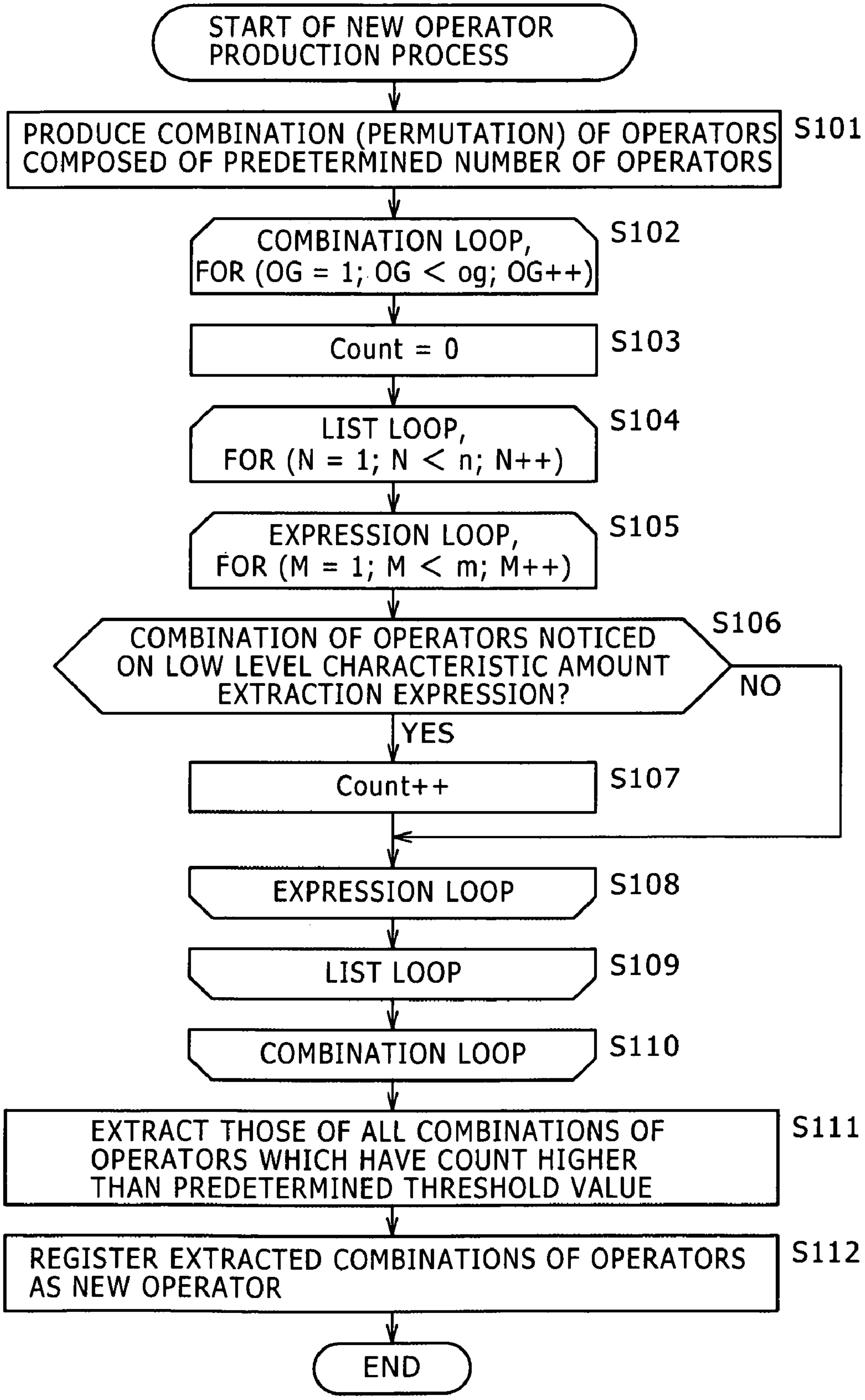
FIG. 37 is a flow chart illustrating a new operator production process.

The new operator production process is described with reference to a flow chart of FIG. 37. First at step S101, the operator group detection section 22 produces a permutation of operators (combination of operators in permutation) the number of which is equal to or smaller than a predetermined number (for example, one to five or so). The number of combinations of operators to be produced here is represented by og.

At step S102, the control section 27 initializes a combination loop parameter OG to one and starts a combination loop. The combination loop is repeated by a number of times equal to the number og of combinations of operators.

At step S103, the control section 27 initializes an appearance frequency Count of the ogth combination of operators to one. At step S104, the control section 27 initializes a list loop parameter N to zero and starts a list loop. The list loop is repeated by a number of times equal to a list number n set in advance. At step S105, the control section 27 initializes an expression loop parameter M to one and starts an expression loop. The expression loop is repeated by a number of times equal to a number m of low level characteristic amount extraction expressions which form one low level characteristic amount extraction expression list.

At step S106, the operator group detection section 22 decides whether or not the ogth combination of operators exists in the Mth low level characteristic amount extraction expression which composes the Nth low level characteristic amount extraction expression list. If it is decided that the ogth combination of operators exists, then the operator group detection section 22 advances the processing to step S107, at which the operator group detection section 22 increments the appearance frequency Count by one. On the contrary if it is decided that the ogth combination operations does not exist, then the operator group detection section 22 skips the step S107 and advances the processing to step S108.

At step S108, the control section 27 decides whether or not the expression loop parameter M is higher than a maximum value m. If the expression loop parameter M is higher than the maximum value m, then the control section 27 increments the expression loop parameter M by one and returns the processing to step S106. On the contrary if the expression loop parameter M is not lower than the maximum value m, that is, if the expression loop parameter M is equal to the maximum value m, then the control section 27 quits the expression loop and advances the processing to step S109.

At step S109, the control section 27 decides whether or not the list loop parameter N is lower than a maximum value n. If the list loop parameter N is lower than the maximum value n, then the control section 27 increments the list loop parameter N by one and returns the processing to step S105. On the contrary, if the list loop parameter N is not lower than the maximum value n, that is, if the list loop parameter N is equal to the maximum value n, then the control section 27 quits the list loop and advances the processing to step S110.

At step S110, the control section 27 decides whether or not the combination loop parameter OG is lower than the maximum value og. If the combination loop parameter OG is lower than the maximum value og, then the control section 27 increments the combination loop parameter OG by one and returns the processing to step S103. On the contrary if the combination loop parameter OG is not lower than the maximum value og, that is, if the combination loop parameter OG is equal to the maximum value og, then the control section 27 quits the combination loop and advances the processing to step S110. By the processes till now, appearance frequencies Count individually corresponding to all operator combinations are detected.

At step S111, the operator group detection section 22 extracts those of the combinations of operators whose appearance frequency Count is higher than a predetermined threshold value, and outputs the extracted combinations to the operator production section 23. At step S112, the operator production section 23 registers each of the combinations of operators inputted from the operator group detection section 22 as a new one operator. The new operator production process is ended therewith.

As described above, according to the new operator production process, a combination of operators which appears in a high appearance frequency and is considered effective in arithmetic operation of a high level characteristic amount is determined as one operator and is used in low level characteristic amount extraction expressions of the next and succeeding generations. Therefore, the speed of production and the speed of growth of low level characteristic amount extraction expressions are enhanced. Further, an effective low level characteristic amount extraction expression can be found out at an earlier stage. Furthermore, since a combination of operators which is considered effective and has been found out manually in the past can be detected automatically, also this is an advantage presented by the present new operator production process.

Now, the process at step S7 of FIG. 7 is described with reference to a flow chart of FIG. 38. At step S141, the high level characteristic amount arithmetic operation section 26 executes a high accuracy reject process for selecting, from among final high level characteristic amount extraction expressions supplied from the high level characteristic amount extraction expression learning section 25, those final high level characteristic amount extraction expressions from which an arithmetic operation result of a high accuracy can be obtained.

Figure 39:
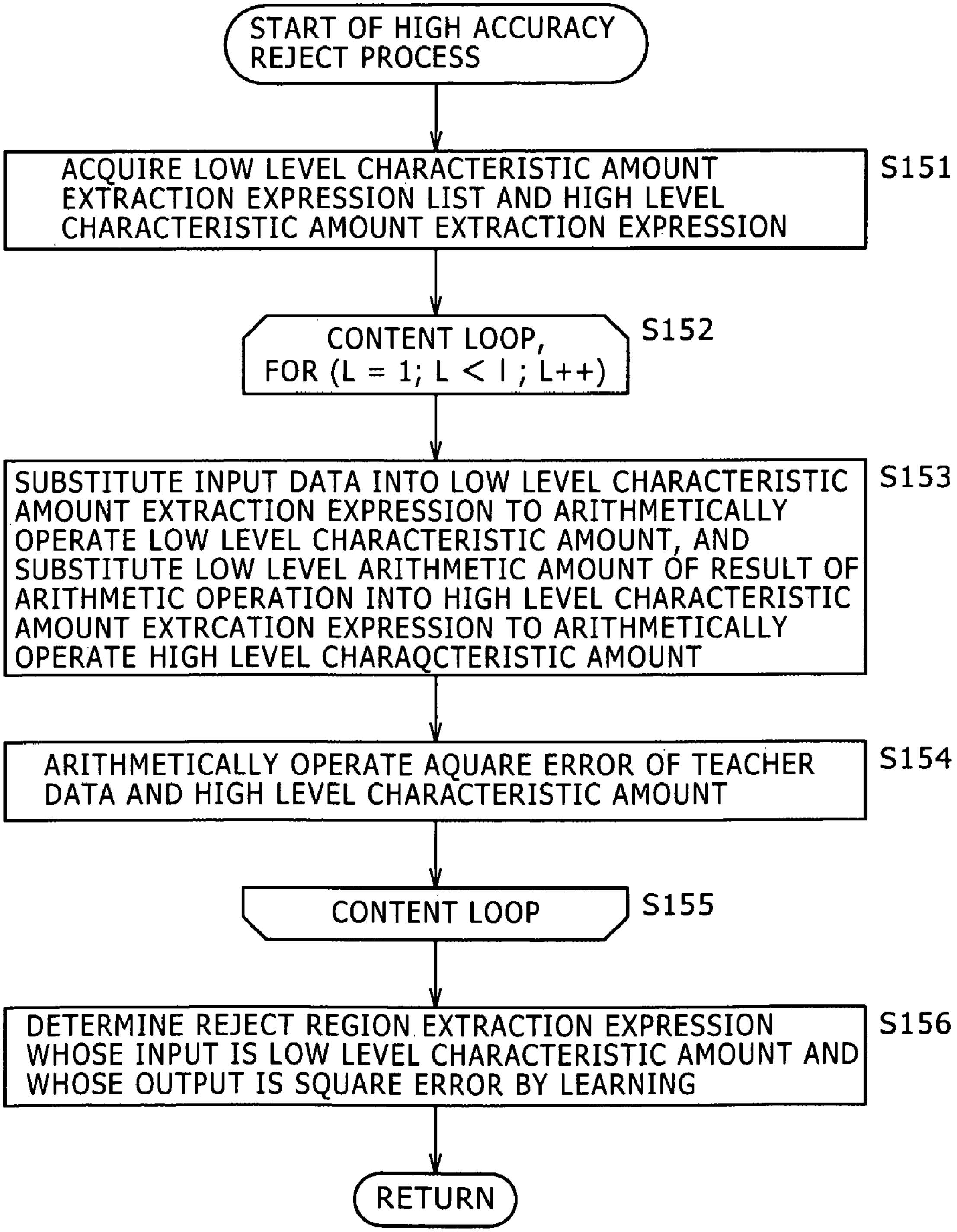
FIG. 39 is a flow chart illustrating a high accuracy reject process.

The high accuracy reject process is based on an idea that the accuracy of a high level characteristic amount has a causal relation to the value of a low level characteristic amount, and obtains a reject region extraction expression which receives a low level characteristic amounts as an input and outputs an accuracy of a high level characteristic amount by learning. The high accuracy reject process is described below with reference to a flow chart of FIG. 39.

At step S151, the low level characteristic amount arithmetic operation section 41 of the high level characteristic amount arithmetic operation section 26 acquires a final low level characteristic amount extraction expression list. The high level characteristic amount arithmetic operation section 42 of the high level characteristic amount arithmetic operation section 26 acquires a final high level characteristic amount extraction expression.

At step S152, the control section 27 initializes a content loop parameter L to one and starts a content loop. The content loop is repeated by a number of times equal to the number l of input data (content data and meta data) which can be prepared in order to execute the high accuracy reject process. It is to be noted that also high level characteristic amounts corresponding to the input data which can be prepared are prepared as teacher data.

At step S153, the low level characteristic amount arithmetic operation section 41 substitutes the Lth input data into the final low level characteristic amount extraction expression list acquired by the process at step S151 and outputs m different low level characteristic amounts which are a result of the arithmetic operation to the high level characteristic amount arithmetic operation section 42 and the reject region extraction expression learning section 44. The high level characteristic amount arithmetic operation section 42 substitutes the m different low level characteristic amounts inputted from the low level characteristic amount arithmetic operation section 41 into the final high level characteristic amount extraction expression acquired by the process at step S151. Then, the high level characteristic amount arithmetic operation section 42 outputs a high level characteristic amount which is a result of the arithmetic operation to the square error arithmetic operation section 43.

At step S154, the square error arithmetic operation section 43 arithmetically operates a square error between the high level characteristic amount inputted from the high level characteristic amount arithmetic operation section 42 and the teacher data (true high level characteristic amount corresponding to the input data). Then, the square error arithmetic operation section 43 outputs the resulting square error to the reject region extraction expression learning section 44. The square error which is the result of the arithmetic operation is an accuracy (hereinafter referred to as characteristic extraction accuracy) of the high level characteristic amount arithmetically operated by the high level characteristic amount arithmetic operation section 42.

At step S155, the control section 27 decides whether or not the content loop parameter L is lower than the maximum value l. If the content loop parameter L is lower than the maximum value l, then the control section 27 increments the content loop parameter L by one and returns the processing to step S153. On the contrary, if the content loop parameter L is not lower than the maximum value l, that is, if the content loop parameter L is equal to the maximum value l, then the control section 27 quits the content loop and advances the processing to step S156. By the processes till now, square errors between high level characteristic amounts obtained by the arithmetic operation and individually corresponding to the input data and teacher data are obtained.

At step S156, the reject region extraction expression learning section 44 produces a reject region extraction expression by learning which is based on the low level characteristic amount extraction expressions inputted from the low level characteristic amount arithmetic operation section 41 and the square errors inputted from the square error arithmetic operation section 43. The reject region extraction expression receives the low level characteristic amounts as an input thereto and outputs a characteristic extraction accuracy of a high level characteristic amount arithmetically operated based on the input low level characteristic amounts. The reject region extraction expression learning section 44 supplies the reject region extraction expression produced thereby to the characteristic amount extraction accuracy arithmetic operation section 45. The high accuracy reject process is ended therewith, and the processing advances to step S142 of FIG. 38.

Referring back to FIG. 38, at step S142, the low level characteristic amount arithmetic operation section 41 substitutes the Lth input data from within the input data of a musical piece whose high level characteristic amount is to be determined into the final low level characteristic amount extraction expression list to arithmetically operate low level characteristic amounts. Then, the low level characteristic amount arithmetic operation section 41 outputs a result of the arithmetic operation to the high level characteristic amount arithmetic operation section 42 and the characteristic amount extraction accuracy arithmetic operation section 45.

At step S143, the characteristic amount extraction accuracy arithmetic operation section 45 substitutes the low level characteristic amounts inputted from the low level characteristic amount arithmetic operation section 41 into the reject region extraction expression supplied from the reject region extraction expression learning section 44 to arithmetically operate a characteristic amount extraction accuracy of the high level characteristic amount arithmetically operated based on the low level characteristic amounts inputted from the low level characteristic amount arithmetic operation section 41. In other words, the characteristic amount extraction accuracy arithmetic operation section 45 arithmetically operates a square error estimated for the high level characteristic amount arithmetically operated by the high level characteristic amount arithmetic operation section 42.

At step S144, the characteristic amount extraction accuracy arithmetic operation section 45 decides whether or not the characteristic amount extraction accuracy arithmetically operated by the process at step S143 is equal to or higher than a predetermined threshold value. If the arithmetically operated characteristic amount extraction accuracy is equal to or higher than the predetermined threshold value, then the processing advances to step S145. At step S145, the characteristic amount extraction accuracy arithmetic operation section 45 causes the high level characteristic amount arithmetic operation section 42 to execute arithmetic operation of a high level characteristic amount. The high level characteristic amount arithmetic operation section 42 substitutes the m different low level characteristic amounts inputted from the low level characteristic amount arithmetic operation section 41 by the process at step S142 into the final high level characteristic amount extraction expression to arithmetically operate a high level characteristic amount. Then, the high level characteristic amount arithmetically operated here is outputted, and the high accuracy high level characteristic amount arithmetic operation process is ended therewith.

It is to be noted that, if it is decided at step S144 that the arithmetically operated characteristic amount extraction accuracy is lower then the predetermined threshold value, then the step 145 is skipped and the high accuracy high level characteristic amount arithmetic operation process is ended.

Accordingly, according to the high accuracy high level characteristic amount arithmetic operation process, the accuracy of a high level characteristic amount calculated using a high level characteristic amount extraction expression can be estimated. Further, since a high level characteristic amount with regard to which a high accuracy cannot be expected is not arithmetically operated, useless arithmetic operation can be omitted.

As described above, according to the characteristic amount extraction algorithm learning process by the characteristic amount extraction algorithm production apparatus 20 to which the present invention is applied, an algorithm by which a characteristic amount can be extracted from musical piece data can be produced rapidly with a high degree of accuracy. Besides, only a high level characteristic amount of a high accuracy can be acquired with a comparatively small amount of arithmetic operation.

It is to be noted that the present invention can be applied not only where a high level characteristic amount of a musical piece is acquired but also where a high level characteristic amount of any type of content data is acquired.

Incidentally, while the series of processes described above can be executed by hardware, it may otherwise be executed by software. Where the series of processes is executed by software, a program which constructs the software is installed from a program recording medium into a computer incorporated in hardware for exclusive use or, for example, a personal computer for universal use which can execute various functions by installing various programs.

Figure 40:
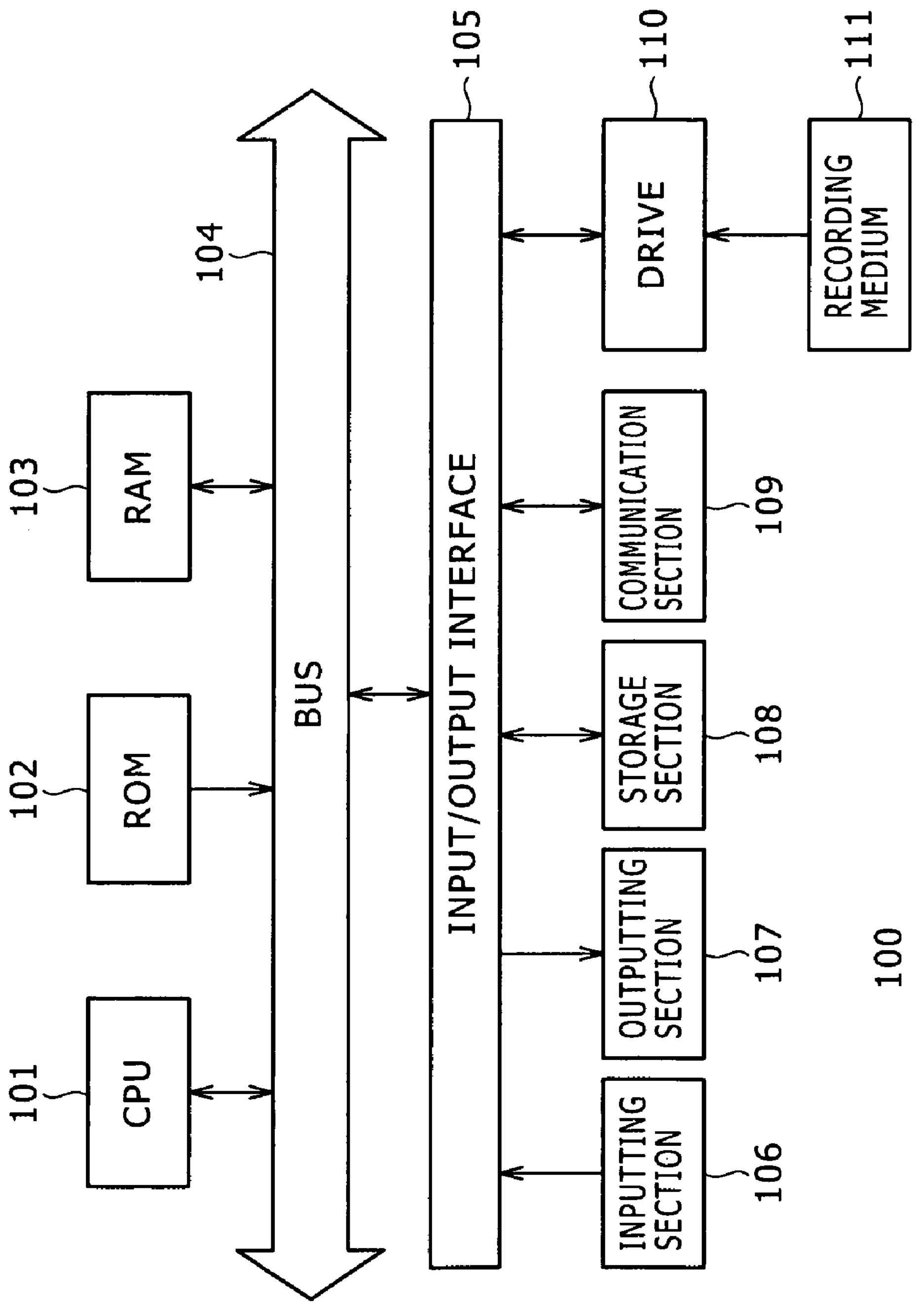
FIG. 40 is a block diagram showing an example of a configuration of a personal computer for universal use.

FIG. 40 shows an example of a configuration of a personal computer which executes the series of processes described hereinabove in accordance with a program. Referring to FIG. 40, the personal computer 100 shown includes a built-in central processing unit (CPU) 101. An input/output interface 105 is connected to the CPU 101 through a bus 104. A read only memory (ROM) 102 and a random access memory (RAM) 103 are connected to the bus 104.

An inputting section 106 including inputting devices such as a keyboard, a mouse and so forth for being operated by a user to input an operation command and an outputting section 107 including a display unit for displaying an operation screen and so forth such as a cathode ray tube (CRT) or a liquid crystal display (LCD) panel are connected to the input/output interface 105. Also a storage section 108 formed from a hard disk drive or the like for storing a program, various data and so forth and a communication section 109 formed from a modem, a local area network (LAN) adapter or the like for executing a communication process through a network represented by the Internet are connected to the input/output interface 105. Further, a drive 110 is connected to the input/output interface 105. The drive 100 reads and writes data from and oh a recording medium such as a magnetic disk (including a floppy disk), an optical disk (including a CD-ROM (Compact Disk-Read Only Memory) and a DVD (Digital Versatile Disk)), a magneto-optical disk (including an MD (Mini Disc), or a semiconductor memory.

The program for causing the personal computer 100 to execute the series of processes described hereinabove is supplied in a state wherein it is stored in the recording medium 111 to the personal computer 100. Then, the program is read out by the drive 110 and installed into the hard disk drive built in the storage section 108. The program installed in the storage section 108 is loaded into the RAM 103 from the storage section 108 in accordance with an instruction of the CPU 101 corresponding to a command from the user inputted to the inputting section 106. The program loaded in the RAM 103 is executed by the CPU 101.

It is to be noted that, in the present specification, the steps which are executed based on the program include not only processes which are executed in a time series in the order as described but also processes which may be but need not necessarily be processed in a time series but may be executed in parallel or individually without being processed in a time series.

The program may be processed by a single computer or may be processed discretely by a plurality of computers. Further, the program may be transferred to and executed by a computer at a remote place.

Further, in the present specification, the term "system" is used to represent an entire apparatus composed of a plurality of devices or apparatus.

While a preferred embodiment of the present invention has been described using specific terms, such description is for illustrative purpose, and it is to be understood that changes and variations may be made without departing from the spirit or scope of the following claims.

What is claimed is:

1. An information processing apparatus which arithmetically operates a characteristic amount of content data, comprising:

first arithmetic operation means for using a low level characteristic amount extraction expression, which receives the content data or meta data corresponding to the content data as an input and outputs a low level characteristic amount, to arithmetically operate the low level characteristic amount;

second arithmetic operation means for using a high level characteristic amount extraction expression, which receives the low level characteristic amount arithmetically operated by said first arithmetic operation means as an input and outputs a high level characteristic amount representative of a characteristic of the content data, to arithmetically operate the high level characteristic amount;

calculation means for calculating an error between the high level characteristic amount arithmetically operated by said second arithmetic operation means and a high level characteristic amount obtained in advance and corresponding to the content data;

production means for producing an error estimation expression, which receives the low level characteristic amount as an input and outputs the error, by learning wherein the error calculated by said calculation means is used as teacher data; and arithmetic operation control means for applying, when the high level characteristic amount corresponding to the content data is to be acquired, the low level characteristic amount arithmetically operated by said first arithmetic operation means to the error estimation expression produced by said production means to estimate the corresponding error and cause said second arithmetic operation means to arithmetically operate the high level characteristic amount in response to the estimated error.

2. The information processing apparatus according to claim 1, wherein said calculation means calculates a square error between the high level characteristic amount arithmetically operated by said second arithmetic operation means and the high level characteristic amount obtained in advance and corresponding to the content data.

3. The information processing apparatus according to claim 1, wherein said control means applies the low level characteristic amount arithmetically operated by said first arithmetic operation means to the error estimation expression produced by said production means to estimate the corresponding error and causes said second arithmetic operation means to arithmetically operate the high level characteristic amount only when the estimated error is lower than a threshold value.

4. A computer-implemented information processing method for an information processing apparatus which arithmetically operates a characteristic amount of content data, comprising steps performed by a computer of:

the computer using a low level characteristic amount extraction expression, which receives the content data or meta data corresponding to the content data as an input and outputs a low level characteristic amount, to arithmetically operate the low level characteristic amount;

the computer using a high level characteristic amount extraction expression, which receives the arithmetically operated low level characteristic amount as an input and outputs a high level characteristic amount representative of a characteristic of the content data, to arithmetically operate the high level characteristic amount;

the computer calculating an error between the arithmetically operated high level characteristic amount and a high level characteristic amount obtained in advance and corresponding to the content data;

the computer producing an error estimation expression, which receives the low level characteristic amount as an input and outputs the error, by learning wherein the calculated error is used as teacher data; and the computer applying, when the high level characteristic amount corresponding to the content data is to be acquired, the arithmetically operated low level characteristic amount to the produced error estimation expression to estimate the corresponding error and cause the high level characteristic amount to be arithmetically operated in response to the estimated error.

5. A computer program, tangibly embodied in a computer-readable storage device, for arithmetically operating a characteristic amount of content data, the program causing a computer to execute a process which comprises the steps of:

using a low level characteristic amount extraction expression, which receives the content data or meta data corresponding to the content data as an input and outputs a low level characteristic amount, to arithmetically operate the low level characteristic amount;

using a high level characteristic amount extraction expression, which receives the arithmetically operated low level characteristic amount as an input and outputs a high level characteristic amount representative of a characteristic of the content data, to arithmetically operate the high level characteristic amount;

calculating an error between the arithmetically operated high level characteristic amount and a high level characteristic amount obtained in advance and corresponding to the content data;

producing an error estimation expression, which receives the low level characteristic amount as an input and outputs the error, by learning wherein the calculated error is used as teacher data; and applying, when the high level characteristic amount corresponding to the content data is to be acquired, the arithmetically operated low level characteristic amount to the produced error estimation expression to estimate the corresponding error and cause the high level characteristic amount to be arithmetically operated in response to the estimated error.

6. An information processing apparatus which arithmetically operates a characteristic amount of content data, comprising:

a first arithmetic operation section configured to use a low level characteristic amount extraction expression, which receives the content data or meta data corresponding to the content data as an input and outputs a low level characteristic amount, to arithmetically operate the low level characteristic amount;

a second arithmetic operation section configured to use a high level characteristic amount extraction expression, which receives the low level characteristic amount arithmetically operated by said first arithmetic operation section as an input and outputs a high level characteristic amount representative of a characteristic of the content data, to arithmetically operate the high level characteristic amount;

a calculation section configured to calculate an error between the high level characteristic amount arithmetically operated by said second arithmetic operation section and a high level characteristic amount obtained in advance and corresponding to the content data;

a production section configured to produce an error estimation expression, which receives the low level characteristic amount as an input and outputs the error, by learning wherein the error calculated by said calculation section is used as teacher data; and an arithmetic operation control section configured to apply, when the high level characteristic amount corresponding to the content data is to be acquired, the low level characteristic amount arithmetically operated by said first arithmetic operation section to the error estimation expression produced by said production section to estimate the corresponding error and cause said second arithmetic operation section to arithmetically operate the high level characteristic amount in response to the estimated error.

* * * * *